United States Patent
Chandler et al.

(10) Patent No.: US 11,128,167 B1
(45) Date of Patent: Sep. 21, 2021

(54) TEMPORARY ELECTRICAL POWER DISTRIBUTION DEVICE, A NETWORK OF TEMPORARY ELECTRICAL POWER DISTRIBUTION DEVICES, AND A METHOD OF USE AND/OR MANUFACTURING THEREOF

(71) Applicants: Dave Chandler, Martinsburg, WV (US); Cody Tomayko, Indiana, PA (US)

(72) Inventors: Dave Chandler, Martinsburg, WV (US); Cody Tomayko, Indiana, PA (US)

( * ) Notice: Subject to any disclaimer, the term of this patent is extended or adjusted under 35 U.S.C. 154(b) by 40 days.

(21) Appl. No.: 16/685,660

(22) Filed: Nov. 15, 2019

Related U.S. Application Data

(60) Provisional application No. 62/767,684, filed on Nov. 15, 2018.

(51) Int. Cl.
| | |
|---|---|
| *H02J 7/00* | (2006.01) |
| *H02J 7/35* | (2006.01) |
| *H02J 13/00* | (2006.01) |
| *H02J 3/38* | (2006.01) |
| *H04N 21/4147* | (2011.01) |
| *G08B 3/10* | (2006.01) |
| *H04N 5/225* | (2006.01) |

(52) U.S. Cl.
CPC ............ *H02J 13/0017* (2013.01); *G08B 3/10* (2013.01); *H02J 3/381* (2013.01); *H04N 21/4147* (2013.01); *H04N 5/2253* (2013.01)

(58) Field of Classification Search
CPC ........ H02J 13/0017; H02J 3/381; G08B 3/10; H04N 21/4147
See application file for complete search history.

(56) References Cited

U.S. PATENT DOCUMENTS

| | | | |
|---|---|---|---|
| 2010/0078016 A1* | 4/2010 | Andrieux ............ | A61M 16/024 128/202.22 |
| 2010/0197222 A1* | 8/2010 | Scheucher ............... | H01Q 9/30 455/11.1 |
| 2019/0087878 A1* | 3/2019 | Gharabegian .......... | A45B 25/18 |
| 2019/0288529 A1* | 9/2019 | Kulick ...................... | H02J 7/35 |
| 2019/0366136 A1* | 12/2019 | Flaster .................. | F04D 13/068 |
| 2020/0044876 A1* | 2/2020 | Piccolo, III ......... | H04L 12/2803 |
| 2021/0016221 A1* | 1/2021 | Lentini ................ | B01D 53/053 |

* cited by examiner

*Primary Examiner* — Carlos Amaya
*Assistant Examiner* — Esayas G Yeshaw
(74) *Attorney, Agent, or Firm* — Garcia-Zamor Intellectual Property Law LLC; Ruy Garcia-Zamor

(57) ABSTRACT

A temporary power distribution device for receiving and distributing electrical power from an external power supply on a temporary basis. The temporary power distribution devices can include a plurality of electrical outlets and/or electrical communication outlets and may include additional safety features for the loss of power and/or the notification of an emergency condition. The temporary power distribution device may be portable and is meant to be portable even during use.

17 Claims, 18 Drawing Sheets

TEMPORARY ELECTRICAL POWER DISTRIBUTION DEVICE, A NETWORK OF TEMPORARY ELECTRICAL POWER DISTRIBUTION DEVICES, AND A METHOD OF USE AND/OR MANUFACTURING THEREOF

CROSS REFERENCE TO RELATED APPLICATIONS

This application claims priority to and benefit of U.S. provisional patent application 62/767,684, filed Nov. 15, 2018, which is hereby incorporated by reference in its entirety as if fully set forth herein.

BACKGROUND

The present invention is generally related to electrical devices, and more specifically to power outlet and conversion devices. More specifically still, the invention is directed toward devices which can receive electrical power from an external source and convert it into multiple regulated outlets while providing other advantageous features directed toward construction and industrial fields.

In many instances when the use of electrical power tools is required, including building construction, natural emergency relief and reconstruction, military efforts and military base construction, mining, and the like, workers often find themselves without permanent sources of electrical power to power said tools. Known methods for linking power tools to a temporary electrical source generally include running electrical extension cords directly from a generator and plugging tools directly into said extension cord. In some cases, extension cords may be tied or stapled to saw-horses or other temporary structures, but these may prevent a fire hazard and cannot prevent power surges and other hazards. Additionally, this requires constant plugging and unplugging to use different tools. Other solutions may include using tools that run on batteries while alternate batteries are charged by a gasoline generator. This creates additional inconveniences and can increase construction time and costs.

Such solutions also create inadvertent dangers, as a loss of power loss can cast a construction site, especially one located inside a building, mine, etc., into complete darkness. If power is lost because of a fire or other hazardous conditions which may pose immediate and catastrophic danger, the only emergency alert for workers in other areas or on other floors of the site is direct contact with workers already aware of the emergency condition, either via radio or wireless device or shouting.

It may be advantageous to provide a temporary power distribution device which has at least one of the following features: multiple outlets to power numerous devices simultaneously; an internal power source for providing temporary illumination when external power is lost; an audible alarm triggered when an emergency condition exists; the audible alarm being powered by either of the external power source or an internal battery; a beacon light triggered when an emergency condition exists; the beacon light being powered by either of the external power source or an internal battery; and a wireless receiver and wireless broadcaster being included to link the power distributions device to other power distribution devices such that an emergency condition may be communicated to the full network of power distribution devices.

SUMMARY

Briefly speaking, one embodiment of the present invention is directed to a temporary power distribution device. The temporary power distribution device may include a power station housing having a base and a tower. The base is configured to be non-permanently placed on a support surface during use, such that the power station housing remains portable. The temporary power distribution device may include a power input connection configured to connect the temporary power distribution device to an external power supply and at least one power output connection located on the power station housing for connection to electronic devices. The device may include an internal power reserve to power desired aspects of the device when outside power is lost, such as an audible alarm or beacon light. The device may also include a signal receiving network device configured to receive an alert signal from another temporary power distribution device within a predetermined range and a signal transmitting network device for sending the alert signal to other temporary power distribution devices within the predetermined range. When at least one of the group of (1) power supplied to the power input connection via the external power supply fails, (2) the alert signal is received from the another temporary power distribution device; and (3) an alert control disposed on the power station housing is activated, an emergency condition is determined and an alert signal is transmitted to other temporary power distribution devices within the predetermined range. This may cause the audible alarm of the temporary power distribution device and any of the temporary power distribution devices which form the network of power distribution devices to be activated and powered by one of the group of: (1) the internal power reserve; and (2) power received from the external power supply. The device may include an alarm override button configured to revoke the determination of the emergency condition.

In some embodiments, the temporary power distribution device may also include a beacon light powered by the internal power reserve and/or power received from the external power supply and configured to activate when the emergency condition is determined. In some embodiments, the temporary power distribution device may also include an illuminator light to shine on an indicia at least when the emergency condition is determined. The device may also include a fire extinguisher retained within a fire extinguisher shelf. The device may also include a retractable belt in a canister disposed on the tower and connectable to other cannisters to physically connect several devices.

In some embodiments, the temporary power distribution device may include first and second tool organizer shelves extending outward from the tower. A handle may extend between the first and second tool organizer shelves. The base may include at least one wheel connected to the base on the same side of the device as the handle such that the base can be tilted and rolled on the at least one wheel to change a temporary position thereof while holding onto the handle. The wheels may be positioned within a wheel cutout in the base and a rotatably connected to a wheel guide.

In still other embodiments, the temporary power distribution device may include a chamber within the tower that contains internal wiring. The chamber may be accessed by removing a maintenance cap inserted in the top of the tower. The device may include a ground fault circuit interrupt being located in the chamber. The device may power a plurality of regulated electrical communication connectors and/or a plurality of electric outlets located on the tower, with an output kill switch being included to kill power to at least one of these output connections for safety reasons. In some embodiments, the device may also include a video recorder disposed on the tower, the video recorder being configured to wirelessly transmit a video stream.

In other embodiments, the device may include an angled guide shelf having an upside down V-shape and located between the plurality of electrical outlets and the base such that power cords connected to one of the plurality of electrical outlets are encouraged to drape toward the lateral sides of the base and so as to not cover the front of the tower and any fire extinguisher held thereon.

In a separate embodiment, the present invention is directed to a network of power distribution devices formed of a plurality of temporary power distribution devices. The temporary power distribution devices may each include a power station housing having a base and a tower. The base is configured to be non-permanently placed on a surface during use, such that the power station housing is portable. The temporary power distribution device may include a power input connection configured to connect to an external power supply and at least one power output connection located on the power station housing for connection to electronic devices, thus the device acts to distribute power. The devices may include an internal power reserve to power aspects of the device when outside power is lost, such as an audible alarm. The devices also include a signal receiving network device configured to receive an alert signal from another temporary power distribution device within a predetermined range and a signal transmitting network device for sending the alert signal to other temporary power distribution devices within the predetermined range such that the plurality of temporary power distribution devices form a network that is wirelessly connected. When an emergency condition is determined by the network—when at least one device determines that (1) power supplied to the power input connection via the external power supply fails, (2) the alert signal is received from the another temporary power distribution device; and (3) an alert control disposed on the power station housing is activated—then the alert signal is transmitted from one temporary power distribution device in the network to the other temporary power distribution devices within the predetermined range and the audible alarms are activated and powered by one of the group of: (1) the internal power reserve; and (2) power received from the external power supply. Each device may include an alarm override button configured to revoke the determination of the emergency condition in a single device or in all devices in the network. In some embodiments, the network of temporary power distribution devices may also be physically connected via retractable belts.

BRIEF DESCRIPTION OF THE DRAWINGS

The foregoing summary, as well as the following detailed description of the preferred embodiments of the present invention will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings.

DETAILED DESCRIPTION OF THE PREFERRED EMBODIMENT

Figure 1:
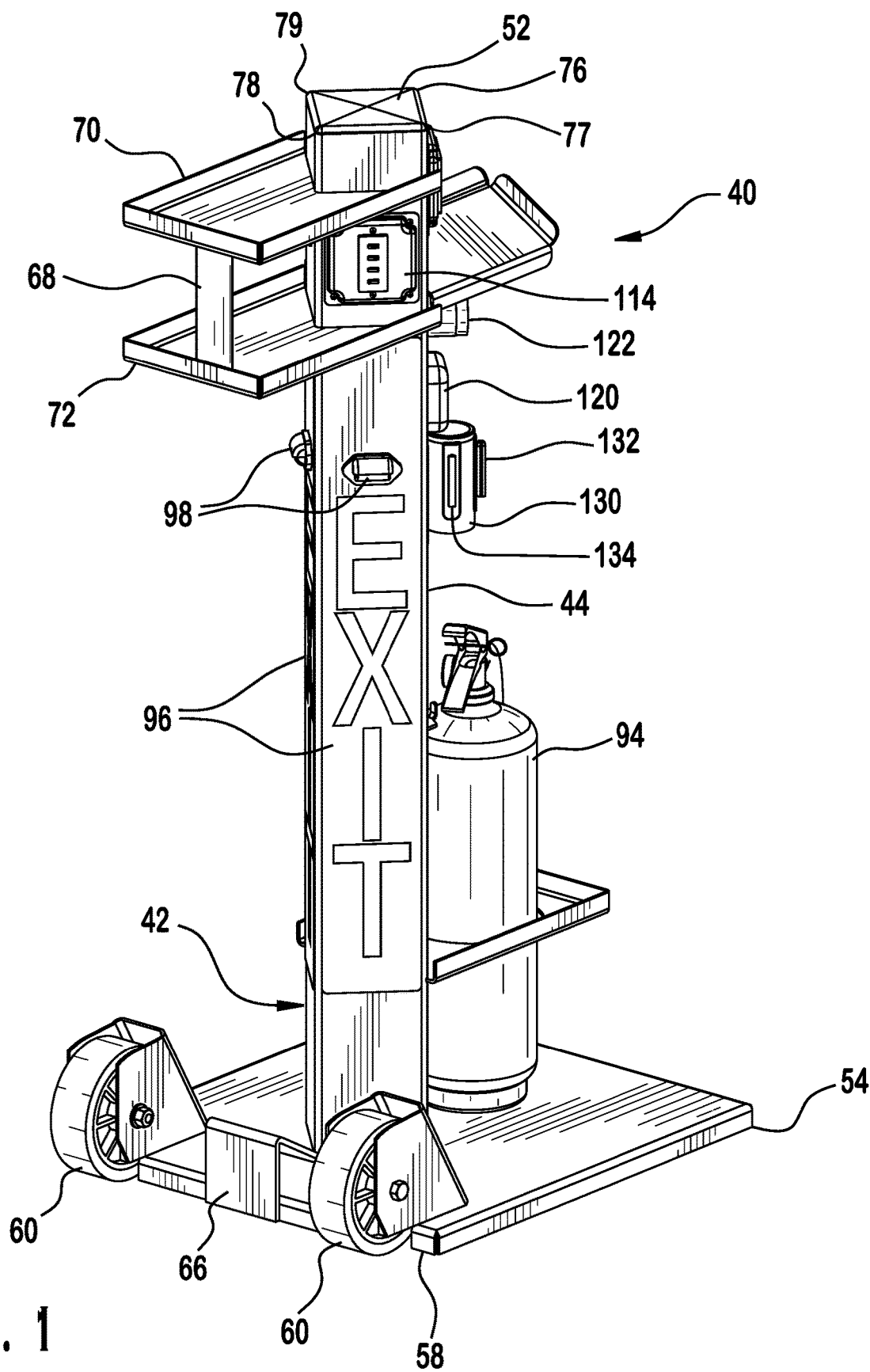
FIG. 1 is a rear perspective view of the temporary power distribution device 40 (also referred to herein as "the device 40") according to a preferred embodiment showing that, most generally, the temporary power distribution device 40 includes a power station housing 42 comprising a base 54 and a tower 14. The tower 44 defines a vertical axis 50 roughly perpendicular to the horizontal axis 150 of the base 54. The tower 44 preferably has a upper tower end 46 and a lower tower end 48, with the upper tower end 46 being higher on the vertical axis 50 of the tower 44 than the lower tower end 48. The upper tower end 46 preferably ends at its highest point in a maintenance cap 52 which allows access to the hollow chamber 104 within the tower 44. The lower tower end 48 preferably ends by being positioned on the base 54. The tower 44 is preferably rectangular prismatic shape and has four corners. The first corner 76 is preferably closest to the front side 56 of the base 54 and the second corner 78 is preferably closest to the rear side 58 of the base. The third corner 77 is preferably positioned on the right side of the device 40 when the device 40 is viewed from behind, closest to the first lateral side 57 of the base 54. The fourth corner 78 is preferably positioned on the left side of the device 40 when the device 40 is viewed from behind, closest to the second lateral side 59 of the base 54.
Figure 2:
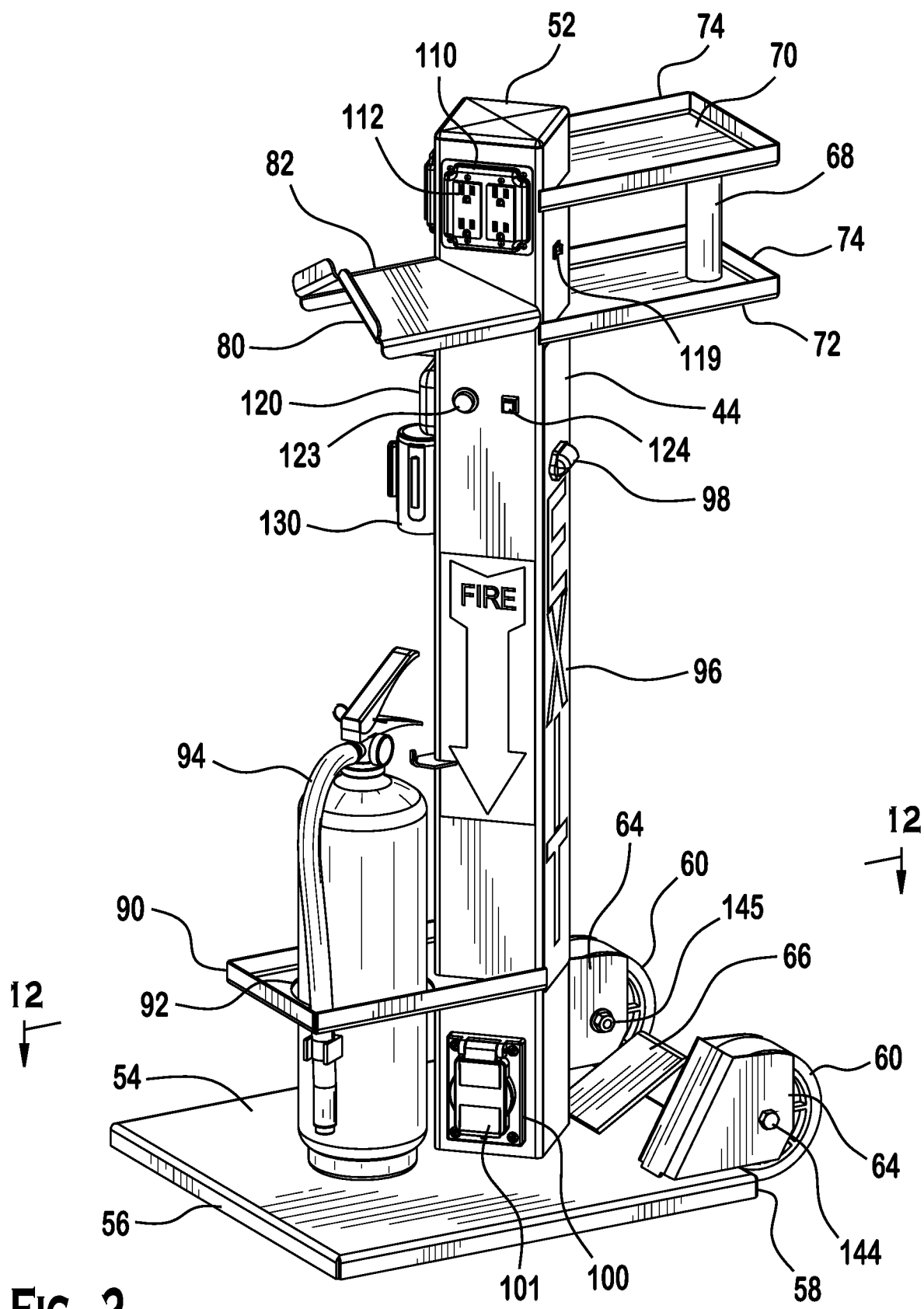
FIG. 2 is a front left side perspective view of the temporary power distribution device 40 according to a preferred embodiment showing some of the safety features included on the device 40. The temporary power distribution device 40 preferably includes an extinguisher shelf 90 on the lower tower end 48, with a power input connection 100 covered by a connection cover 101 positioned generally below the extinguisher shelf 90. The extinguisher shelf 90 preferably defines an extinguisher cutout 92, such as a hole therethrough which is roughly circular in shape and has a larger circumference than a hypothetical circle around the perimeter of the fire extinguisher 94. A fire extinguisher 94 is preferably placed in the extinguisher cutout 92 such that it rests on the base 54 and is prevented from moving laterally parallel to the horizontal axis 150 of the base 54 by the extinguisher shelf 92. The tower 44 preferably also include a canister 130 defining a receptacle 134 and containing a retractable belt 132. The receptacle 134 is preferably configured such that the end of another retractable belt 132 can be engaged or inserted and detachably retained therein. This configuration allows for two devices 40 to be physically connected to one another.

Certain terminology is used in the following description for convenience only and is not limiting. The words "right,"

"left," "up," and "down" designate the directions as they would be understood by a person viewing the temporary power distribution from the rear side, unless specified otherwise. The words "outer" and "inner" refer to directions away from and toward, respectively, the geometric center of the pictured tooth or device pictured. The words "front" and "rear" refer to the sides of the device as designated by reference numerals 56 and 58 in the figures. The wording "lateral" refers to ends toward opposite horizontal ends. The words "top" or "upper" and "bottom" or "lower" designate the directions as they would be understood by a person viewing the relevant figure of the drawings. Additionally, the words "a" and "one" are defined as including one or more of the referenced items unless specifically stated otherwise. The terminology includes the words above specifically mentioned, derivatives thereof, and words of similar import.

Referring to FIGS. 1-20, wherein like numerals indicate similar elements, the temporary power distribution device 40 (also referred to herein as "the device 40") is preferably used to provide electrical power during periods when permanent electric power is not available. For example, when a building or home is being built or rebuilt, in times of national emergency following natural disasters or warfare, in mining, and in other relevant industries, there are times when no internal wiring is present or cannot provide electric power. Thus, temporary power must be provided with extension power cords 88 and the like. The temporary power distribution device 40 may serve as a power station, providing a single conduit that receives power from an external power supply 102 and distribute that power safely to tools, fans, radios, and any other devices requiring electricity. The external power supply 102 is preferably a gasoline-powered electrical generator. However, in some preferred embodiments, the external power supply 102 may include batteries, solar batteries, wind-powered batteries, electrical outlets on other sites, and the like. Those of ordinary skill in the art will appreciate from this disclosure that any source for electrical power may be provided to form the external power supply 102.

The temporary power distribution device 40 includes a power station housing 42 which includes a base 54 and a tower 44. The base 54 and tower 44 are preferably positioned perpendicular to one another. The base 54 and tower 44 are preferably formed of a strong and durable material, such as stainless steel, alloy, plastic, PVC, rubber, or any other suitable material. Preferably, this material is not flammable, and thus it is preferred that the tower 44 not be made of wood even if the base 54, maintenance cap 52, indicia 96, first tool organizer shelf 70, second tool organizer shelf 72, or other elements incorporate wood materials. Preferably, both the tower 44 and base 54 are formed of the same material, but each may have additional elements formed of alternate materials. The base 54, for example, may include a tacky footer formed of rubber or plastic to increase stability. Alterative the base 54 could use NOMEX or other flame-resistant fiber to form footers for the base to increase stability while reducing the possibility of footers melting during a crisis event. For another example, the tower 44 may be lined with a NOMEX like material and rubber or some other material which does not conduct electricity, to further prevent fire or electrocution. Those of ordinary skill in the art will appreciate from this disclosure that any suitable material may be used to form the tower 44 or base 54.

Referring to FIGS. 1-2, 4-6, and 17-18 it is preferred that the base 54 is generally flat and defines the horizontal axis 150 of the device 40, providing stability to the device 40 when placed on a support surface 152, such as a floor, roof, vehicle or ship decking, boxes, and the like. In some preferred embodiments, the base 54 may be fully or partially solid, made of some uniform material of a uniform thickness to be generally flat. In other preferred embodiments, such as those shown in FIGS. 17 and 18, the base 54 may be formed of a thin material (such as a metal) with the end crimped down to form a flat rim to rest on the support surface 152. The base 54 is preferably generally square or rectangular in shape, with a preferably flat front side 56 position opposite a rear side 58, and preferably flat first and second lateral sides 57, 59 on opposite lateral ends. Those of ordinary skill in the art will appreciate from this disclosure that the base 54 may be provided in any suitable shape, such as circular, ovular, triangular, etc., and comprised of any number of parts, without exceeding the scope of this disclosure. For example, in some preferred embodiments, the base 54 may have legs or feet, or may form an arch shape on four sides that resemble legs.

In some preferred embodiments, the base 54 defines at least one wheel cutout 62 therethrough, with the base 54 also including a wheel guide 64 disposed about the at least one wheel cutout 62. At least one wheel 60 is preferably rotatably mounted to the wheel guide 64. At least one wheel 60 is positioned on the rear side 58 of the base 54, positioned within a wheel cutout 62. The wheel guide 64 may be formed as a portion of the base 54 such that the wheel guide 64 are formed of the same member, particularly if the base 54 and wheel guide 64 are formed of molded plastic or metal. Alternatively, the wheel guide 54 may be bracketed, welded, or scremed to the base 54. The wheel cutout 62 is preferably a rectangular section cut out of the base 54 being wider than the wheel 60, to allow a wheel 60 to sit partially within the perimeter of the base 54. One wheel guide 64 is preferably provided about each wheel cutout 62 forming a shape that is configured to cover the portion of the wheel 60 that extends through the wheel cutout 62 to keep debris or body parts from impeding the wheel as it rotates. The wheels 60 are preferably circular, to allow for easy rotations, and are preferably formed of a suitable material such as hard rubber, vulcanized rubber, metal, hard plastic, or the like. The wheels 60 preferably each contain a bearing 142 to allow the wheels to rotate about an axis. This axis is preferably formed by a pin 144 inserted through both sides of a wheel guide 64 and through the bearing 142 in a wheel 60. The pin 144, preferably a threaded screw on flat rivet, is preferably secured in place by a fastener 145, such as a nut, lock washer, etc. It is preferred that two wheels 60 are provided, each within a separate wheel cutout 62 and wheel guide 64, with a separate bearing 142 therein and a separate pin 144 passing therethrough. In some preferred embodiments, two or more wheels 60 may share a wheel cutout 63 and pin 144, while each wheel 60 has its own bearing 142 therein. Those of ordinary skill in the art will appreciate that any number of wheels 60 can be provided in any suitable shape and in any suitable configuration to allow for rotation. Those of ordinary skill in the art that any number of wheel cutouts 62 and/or wheel guides 64 may be provided or omitted.

Figure 11:
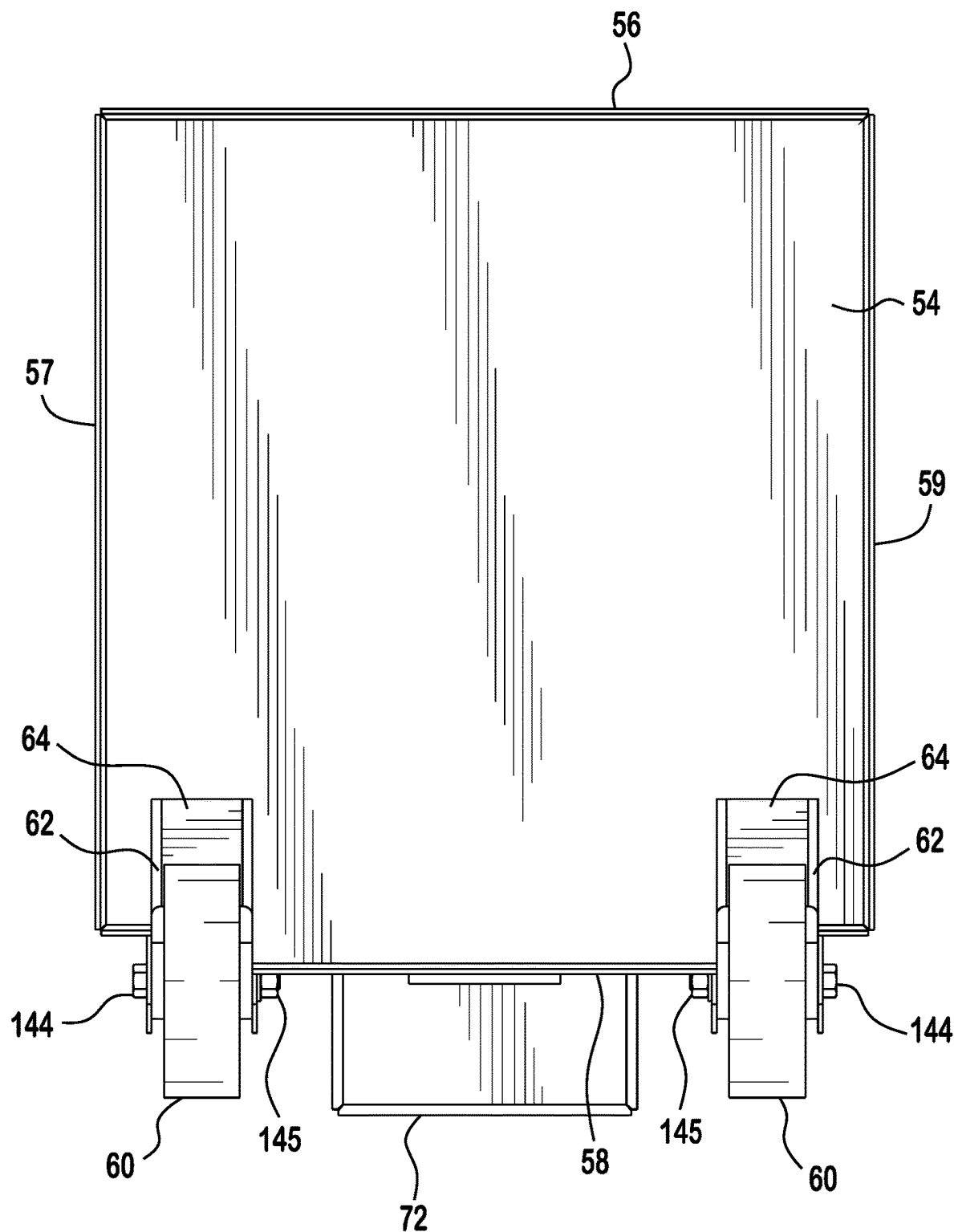
FIG. 11 is a bottom elevational view of the temporary power distribution device 40 of a preferred embodiment, further demonstrating the preferred position of the wheels 60 within the wheel cutouts 62 and wheel guides 64. The figure also demonstrates that the foot prop 66 preferably extends outward and upward from the rear side 58 of the base 54 to allow a foot 146 to lift the base 54 from a support surface 152, transferring the full weight of the device 40 directly onto the wheels 60.
Figure 12:
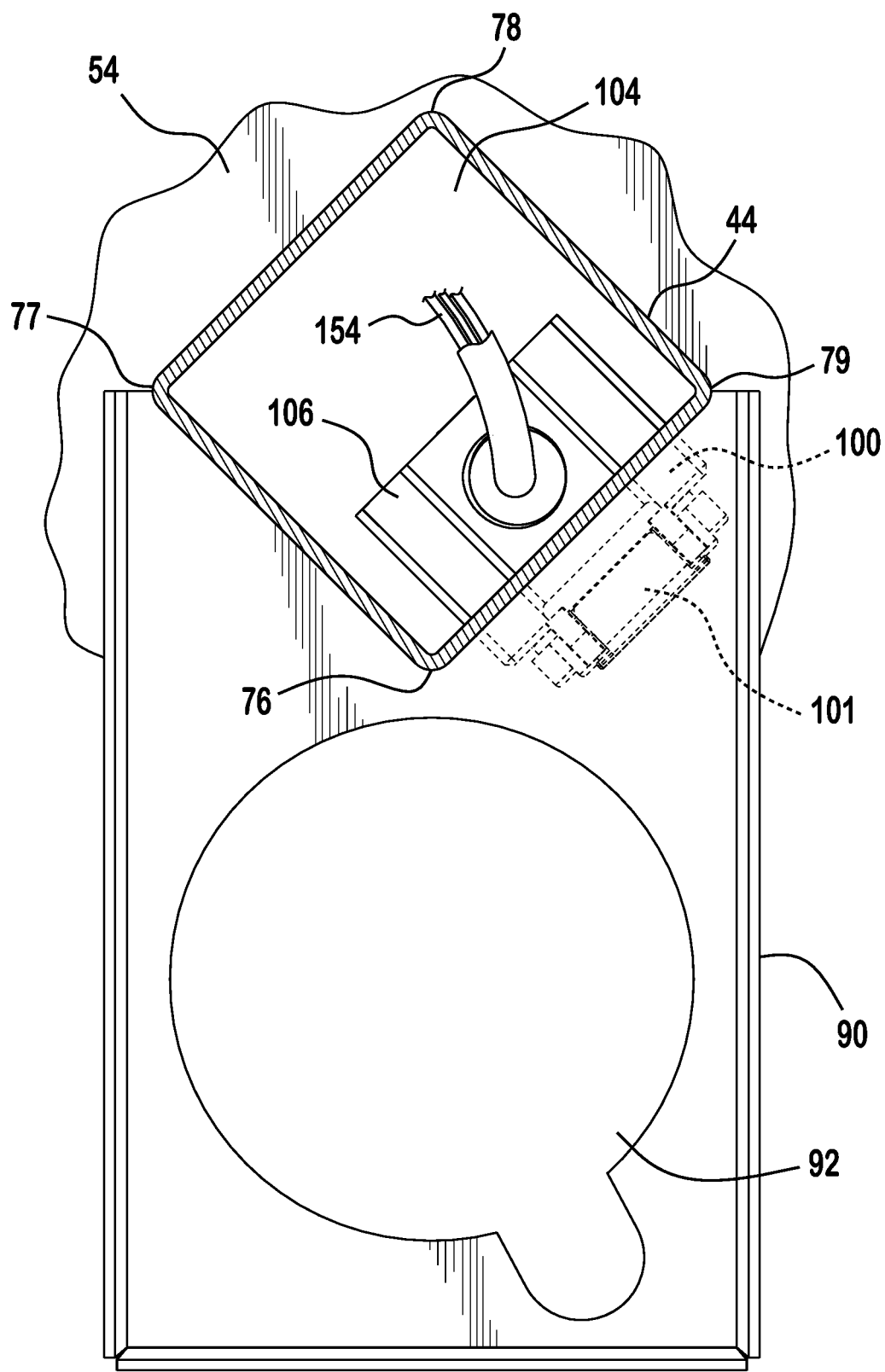
FIG. 12 is a partial cross-sectional view of the temporary power distribution device 40 of a preferred embodiment, demonstrating the preferred configuration of the extinguisher shelf 90 and the preferred shape and position of the extinguisher cutout 92 therein. The figure further shows that the tower 44 is preferably partially or completely hollow to defines a chamber 104 at some point therein. The power output connection 100 and connection cover 101 are preferably positioned on the outside of the tower 44. The output connection 100 may be connected to internal wiring 154 within the device 40, as well as a ground fault circuit interrupt 106 to protect the internal wiring 154 from power surges.
Figure 13:
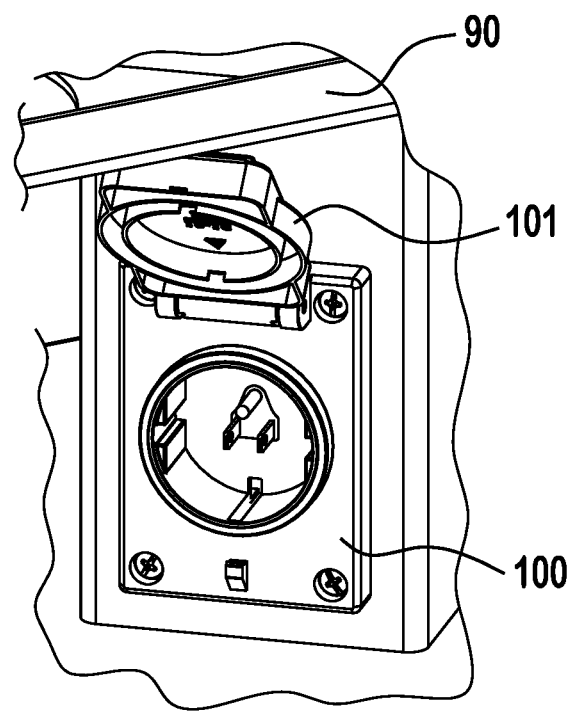
FIG. 13 is a partial perspective view of the temporary power distribution device 40 of a preferred embodiment, demonstrating the preferred configuration of the power output connection 100 and the connection cover 101. The figure further demonstrates the preferred positioning of the output connection 100 below the extinguisher shelf 90 and above the base 54.
Figure 17:
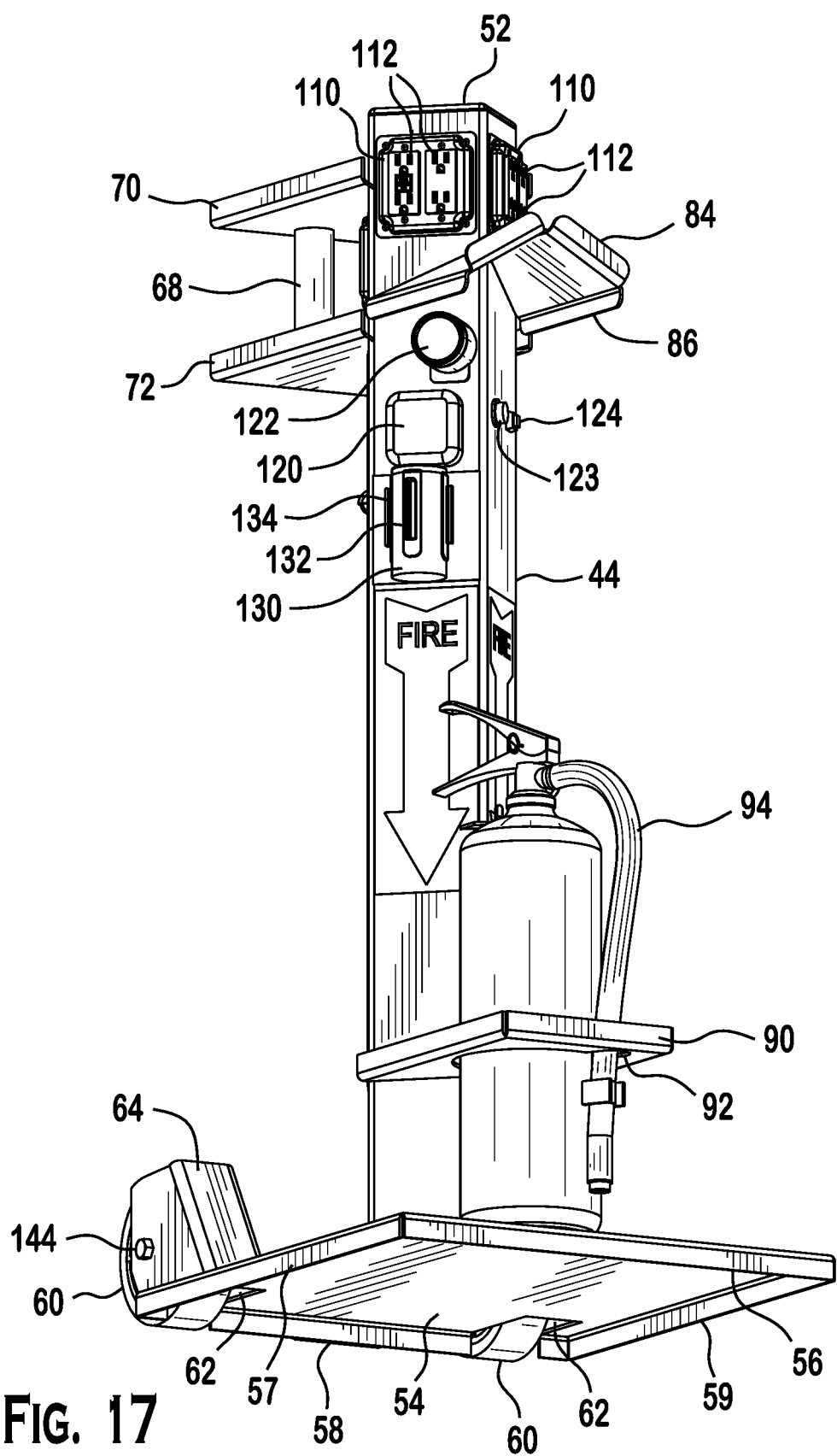
FIG. 17 a front underside perspective view of the temporary power distribution device 40 of the preferred embodiment, demonstrating the preferred configuration of the cord retaining lip 84 and guide extension 86 on the angled guide shelf 80. Specifically, the cord retaining lip 84 is formed by the front portion of the angled guide shelf 80 bending up at close to a 90-degree angle. The guide extension 86 is formed by each of the lateral edges of the angled guide shelf 80 sloping downwards at close to a 90-degree angle. The guide extensions 86 preferably bias extension cords 88 plugged into at least one of the plurality of electrical outlets 112 to push outward toward either the first or second lateral sides 57, 59 of the base 54.
Figure 18:
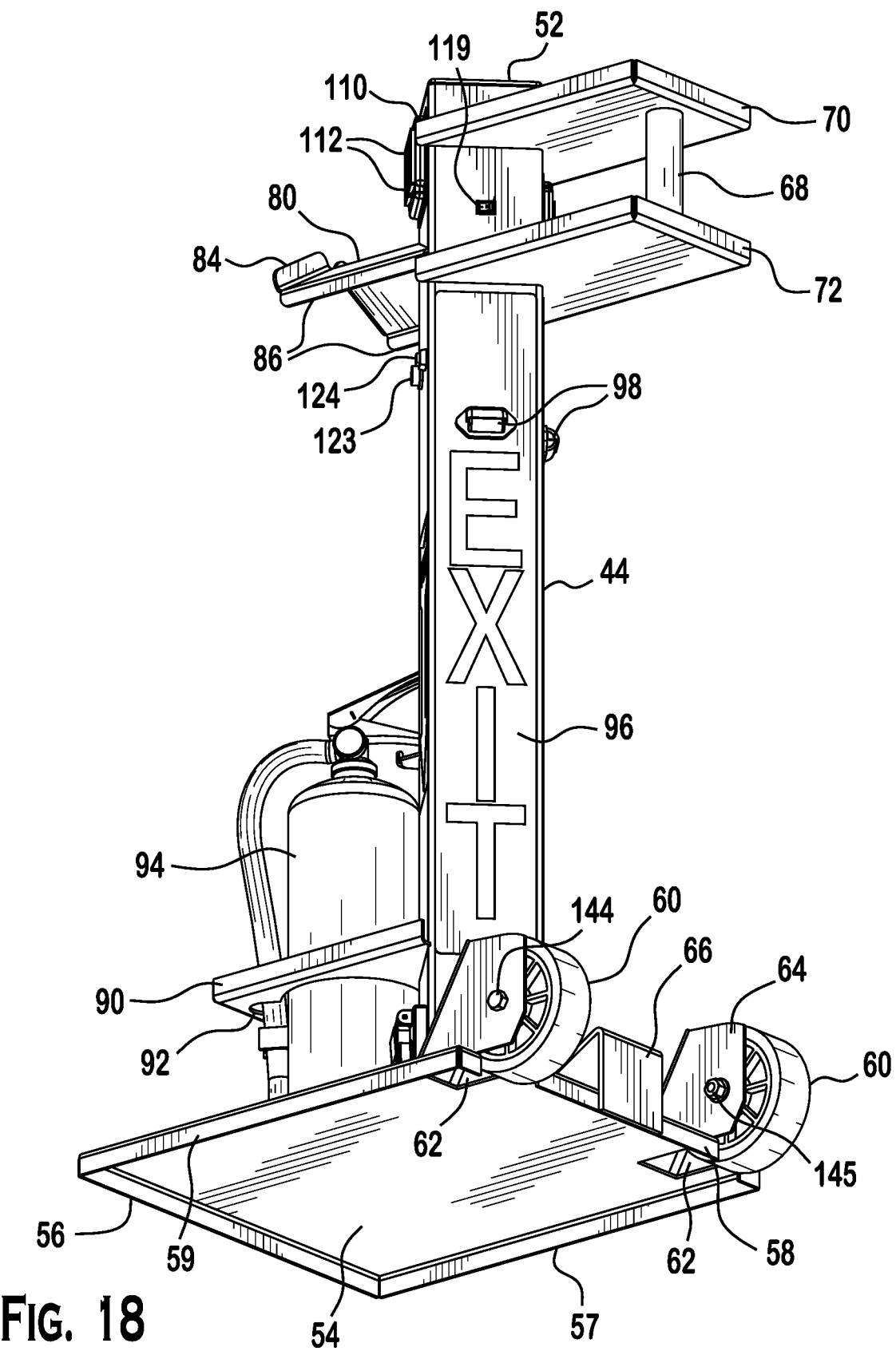
FIG. 18 a left underside perspective view of the temporary power distribution device 40 of the preferred embodiment, demonstrating the preferred configuration of the wheels 60 within wheel cutouts 62 in the base 54 and wheel guides 64.

Referring to FIGS. 11 and 17-18, a foot prop 66 may be positioned on the rear side 58 of the base 54, preferably between two wheel guides 64. The foot prop 66 preferably is roughly formed in the shape of a right triangle when taken in connection with the base 54, with one face extending directly upward from the rear sided 58 and a second face extending inward and downward from the end of the first to present an upward facing angled surface. When a foot 146 is placed on the upward facing angled surface and pressure is applied, the angled configuration will cause the base 54 to tilt backwards and bring the weight of the device 40 onto the one or more wheels 60. The foot prop 66 may be formed of any suitable shape to allow a person to use his or her foot 146 to tile the base 54 backwards. The wheel guides 64 and foot prop 66 are preferably formed of bent or molded metal, and welded, riveted, or bracketed to the base 54. However, those of ordinary skill in the art will appreciate from this disclosure that the foot prop 66 and wheel guides 64 may be formed of any suitable material and attached to the base 54 via any suitable manner without exceeding the scope of this disclosure. The preferred configurations of the base 54, including at least one wheel 60 in a wheel cutout 62 in the base 54, ensures that the base 54 is configured to be non-permanently positioned, even during use, such that the power station housing 43 is portable. The at least one wheel 60, which is connected to the base 54, is configured such that the base 54 can be tilted and rolled on the at least one wheel 60 to change a temporary position thereof while holding onto the handle 68.

The temporary power distribution device 40 is configured to be non-permanently placed on a support surface 152 during use. Non-permanently preferably means that the temporary power distribution device 40 is meant to eventually be moved but does not preclude the device 40 being temporarily affixed to a support surface 152. Those of ordinary skill in the art will appreciate from this disclosure that the device 40 may be bolted, latched, brackets, or otherwise temporarily secured to a support surface 152 without exceeding the scope of this disclosure.

Referring to FIGS. 1-2 and 4-6, the tower 44 is preferably positioned perpendicular to the base 54, with the lower tower end 48 being positioned on the base 54 such that the tower extends vertically upward to define a vertical axis 50. It is preferred that the tower 44, and specifically the lower tower end 48, be affixed to the base 54 roughly near the center of the base 54 by being welded, riveted, or bracketed to the base 54. In is important that the tower 44 be affixed to the base 54 through significantly strong method to ensure that tower 44 does not become disconnected from the base 54 when the temporary power distribution device 40 is moved by pulling on the tower 44. However, those of ordinary skill in the art will appreciate from this disclosure that the tower 44 may be affixed to the base 54 via any suitable manner without exceeding the scope of this disclosure. The tower 44 extends upward from the base 54 to define a vertical axis 50 of the temporary power distribution device 40. Those of ordinary skill in the art will appreciate from this disclosure that the tower 44 need not extend significantly vertically, and thus may not necessarily rise far from the base 54 but may instead cover most of the area of the base 54.

Referring to FIGS. 1, 10, 12, and 20, the tower 44 is preferably rectangular prismatic in shape and preferably has four corners. It is preferred that the flat sides of the tower 44 not run parallel to the sides of the base 54, but instead are roughly forty-five degrees offset and the corners of the tower 44 preferably align with the sides of the base 54. Specifically, it is preferred that the first corner 76 of the tower 44 is positioned closest to the front side 56 of the base 54 and the second corner 78 is preferably closest to the rear side 58 of the base 54. The third corner 77 is preferably positioned on the first lateral side 54 of the base 54, and the fourth corner 78 is preferably positioned on the second lateral side 59 of the base 54. Stated more succinctly, in the preferred embodiment the base 54 preferably has a rear side 58 proximate to the at least one wheel 60 and a front side 56 located opposite to the rear side. The tower 44 preferably has a rectilinear cross section, as viewed perpendicular to the vertical axis 50, such that the first corner 76 of the rectilinear cross section is located closest to the front side 56. While it is preferred that the tower 44 be rectangular prismatic, in some preferred embodiments the tower may be cylindrical, hexagonal, octagonal, or form any other suitable shape.

The power station housing 42, preferably the tower 44, may define a chamber 104 therein in which electrical components such as the internal power reserve 108, ground fault circuit interrupt 106, and/or internal wiring 154 may be located. The upper tower end 46 preferably ends in a maintenance cap 52, a metal or plastic cap which covers the opening of the chamber 104 but may be roved to allow for maintenance of the electronic components within. In the preferred embodiment, a video recorder 136 may be positioned in the chamber 104 and configured to wirelessly transmit a video stream. The maintenance cap 52 may allow the video recorder 136 to be moved or serviced.

Referring to FIGS. 1-2, 12-13 and 17-18, the temporary power distribution device 40 preferably includes a power input connection 100 to connect the internal wiring 154 and other electronic circuitry of the device 40 to an external power supply 102. Preferably, the power input connection 100 is located proximate the lower tower 48 near where the tower 44 is connected to the base 54. The power input connection 100 is preferably formed by a socket and a three-pronged extension within the socket. In some preferred embodiments, the power input connection 100 is covered by an input cover 138. The input cover 138 may be a hinged cover, which may include a spring to bias the input cover 138 to cover the power input connection 100. In other preferred embodiments, the input cover 138 may be a cap which is placed over the power input connection 100 and retained thereto by friction or magnets. The ground fault circuit interrupt 106 is preferably a UL Approved Ground Fault Circuit Interrupter (GFCI).

Referring to FIGS. 1-2, 12, and 17-18, the temporary power distribution device 40 includes an extinguisher shelf 90 extending outward from the tower 44 and spaced above the base 54. The extinguisher shelf 90 also defines an extinguisher cutout 92 configured such that a fire extinguisher 94 can be located within the extinguisher cutout 92 and braced by the extinguisher shelf 90 and the base 54.

The power input connection 100 end and input cover 138 preferably faces a location configured for holding a fire extinguisher 94. This location preferably is formed the extinguisher shelf 90, which projects outward from the tower 44. The extinguisher shelf 90 is a flat and solid shelf that preferably extends between the third corner 77 and fourth corner 79 and had the first corner 76 roughly at the middle of the extinguisher shelf 90. The fire extinguisher 94 is preferably an aerosol canister full of foam, powder, or some other fire-retardant material designed to dispel said material to put out a fire. The extinguisher shelf 90 preferably defines an extinguisher cutout 92, a hole therein roughly in the shape of the circumference of the fire extinguisher 94 but larger in diameter. The fire extinguisher 94 is preferably placed within the extinguisher cutout 92 such that it rests on the base 54 and is retained from lateral movement by the extinguisher cutout 92.

The temporary power distribution device 40 preferably also includes an indicia 96 on one of more sides of the tower 44 to provide a visual cue for determining a location of the temporary power distribution device 40. The indicia 96 may include wooden, plastic, or metal signs with words like "EXIT" or "POWER" inscribed thereon. In order to facilitate the communication of these messages, an illuminator light 98 may be disposed on the tower 44 and configured to shine on each of the indicia 96. In some preferred embodiments, the indicia 96 may be semitransparent and the illuminator light 96 may shine through the indicia 96 to illuminate it. The illuminator light 96 may be configured to always be active or may activate when an emergency condition is determined. In such cases, the illuminator light 98 may be powered by either the internal power reserve 108 or power received from the external power supply 102.

Figure 16:
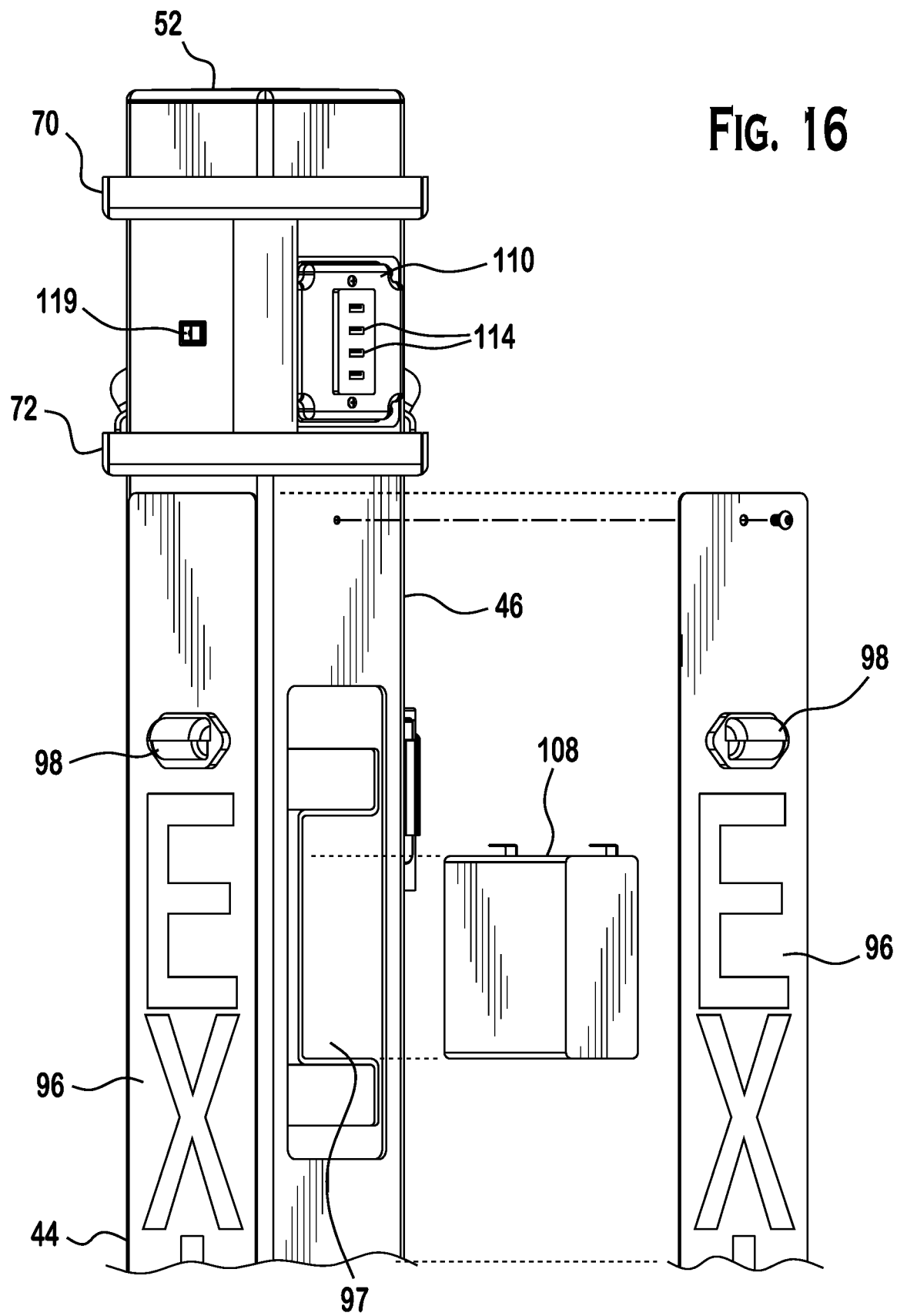
FIG. 16 is a partial rear elevational view of the temporary power distribution device 40 of a preferred embodiment, demonstrating that in some preferred embodiments, the internal power source 108 may comprise a removable battery pack 99 inserted into a battery housing 97 within the chamber 104. The battery housing 97 may be positioned in an easily accessible location, such as behind removable indicia 96. In some preferred embodiments, the indicia 96 and the illuminator light 98 may be formed of a single member.

Referring to FIG. 16, the illuminator light 98 may be powered by an internal power reserve 108 in the form of a battery pack 99 which may be inserted into a battery housing 97 behind the indicia 96. Such a configuration can allow the battery pack 99 to be easily checked, removed, or replaced. The battery pack 99 may provide power to portions of the device 40 when the external power supply 102 ceases to provide power, either because it has been disconnected from the device 40 or it is no longer providing power.

Figure 15:
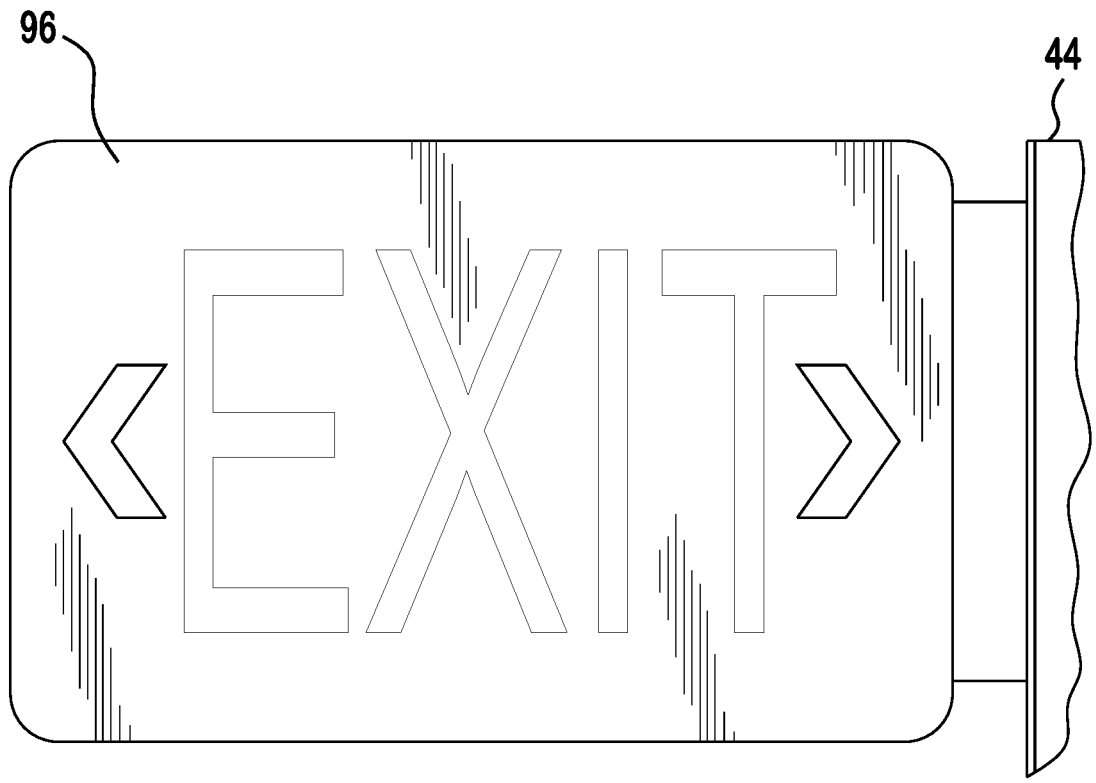
FIG. 15 is a partial front elevation view of the temporary power distribution device 40 of the alternative preferred embodiment shown in FIG. 14. The figure shows the preferred configuration of the indicia 96 in this preferred embodiment.
Figure 14:
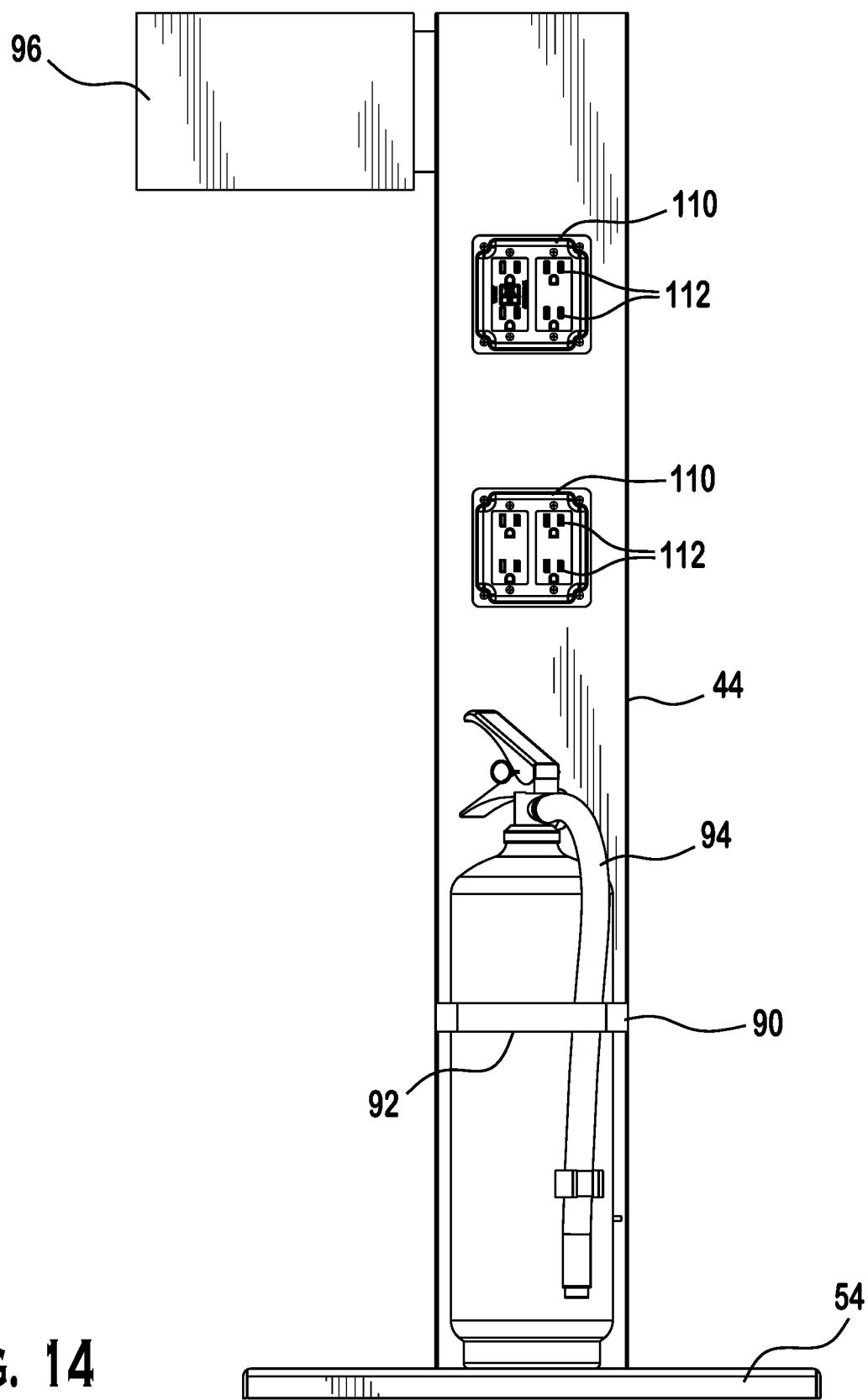
FIG. 14 is a front elevational view of the temporary power distribution device 40 of an alternative preferred embodiment, the temporary power distribution device 40 comprising a power station housing 42 having a base 54 and tower 44. Positioned on the front side of the tower 44 are a plurality of electrical outlets 112 and a fire extinguisher 94. The fire extinguisher 94 is retained along the tower 44 by an extinguisher shelf 90 which is formed of two clips, the space between the clips of the extinguisher shelf 90 defining an extinguisher cutout 92. The indicia 96 may be affixed to a lateral side of the tower 44.

Referring to FIGS. 14 and 15, the indicia 96 be formed of a plastic sign which may be affixed to the side of the upper tower end 46 such that it projects outward from a lateral side. In this alternate preferred embodiment, the indicia 96 may be formed of several layers of plastic, with hard plastic outer housing containing one or more lights, a frosted clear plastic faceplate on the front and back sides, and a face plate overlay with text or pictures cutout placed in front of each face plate. The indicia 96 may include text such as the word "EXIT" as shown in the Figures, which may be formed by a cutout in the faceplate overlay or may be merely painted on the indicia 96. The indicia 96 may be connected to the tower 44 by metal or plastic brackets, or may be inserted into a slot, a clip, fastener, magnets, or any other means for affixing the indicia 96 to the tower 14.

Referring to FIGS. 2 and 8-10, the temporary power distribution device 40 of the preferred embodiment preferably includes at least one power output connection 110. The power output connection 110 preferably includes at least one connection into which phones, tools, radios, other temporary power distribution devices 40, and any other electric device could derive power.

In the preferred embodiment, the power output connection 110 includes a plurality of electrical outlets 112, such as three pronged outlets, and a plurality of regulated electrical communication outlets 114, such as USB outlets, located on the tower 44. At least some of the plurality of electrical outlets 112 and/or the plurality of regulated electrical communication outlets 114 are preferably located on the upper tower end 46.

Preferably, the plurality of electric outlets 112 includes two sets of four construction grade outlets within construction grade UL Approved faceplates, with each set being positioned on opposite lateral sides of the first corner 76 of the tower 44. In some preferred embodiments, electrical outlets 112 may also be positioned on the upper tower end 46 and/or lower tower end 48 about the second corner 78 of the tower 44. Power cords 88, such as UL Approved grounded appliance cords, may be plugged into at least one of the plurality of electrical outlets 112. Those of ordinary skill in the art will appreciate from this disclosure that any number of electrical outlets 112 may be provided on any portion of the tower 44 without exceeding the scope of this disclosure.

The temporary power distribution device 40 preferably also includes an angled guide shelf 80 having an upside down V-shape and located between the plurality of electrical outlets 112 and the base 54 such that power cords 88 connected to one of the plurality of electrical outlets 112 are encouraged to drape on either lateral sides of the tower 44 to avoid covering the fire extinguisher 94 held thereon. The angled guide shelf 80 preferably has an apex 82 where the angular sides of the angled guide shelf 80 meet, and the apex 82 is aligned with the first corner 76.

It is preferred that the angled guide shelf 80 is positioned closely below the electrical outlets 112 on the tower 44, with the angled guide shelf 80 coming to an apex 82 along the first corner 76 of the tower 44. Preferably, the angled guide shelf 80 is positioned between 2 and 12 inches below some of the plurality of electrical outlets 112. It is preferred that the front side of the angled guide shelf 80 turns upwards to form a cord retaining lip 84 to keep power cords 88 on the angled guide shelf 80. Through such a configuration, with the cord retaining lip 84 turning upwards, the angled guide shelf 80 keeps the power cords 88 from sliding forward off of the angled guide shelf 80. To reduce manufacturing costs, it is preferred that the cord retaining lip 84 be broken about the apex 82 likely forming a gap.

The angled guide shelf 80 preferably also includes guide extensions 86, lateral ends of the angled guide shelf 80 which curve downward from each lateral end roughly 90 degrees. This configuration further allows the angled guide shelf 80 to push power cords 88 away from the front of the device 40. The corners when the guide extensions 86 and/or cord retaining lip 84 meet the angled guide shelf 80 are preferably curved, to allow power cords 88 to rest more gently and may further allow power cords 88 to be wrapped around the angled guide shelf 80, as seen in the figure.

The at least one power output connection 110 preferably also includes a plurality of regulated electrical communication outlets 114, such as USB outlets, into which certain wireless communication devices 116, such as smart phones and tablets, can be plugged by a communication cord 118. With the increasing prevalence of wireless communication devices 116 such as smart phones and tablets, and their usefulness in the construction industry, this feature may prove particularly advantageous. The plurality of regulated electrical communication outlets 114 are preferably positioned roughly level with the plurality of electrical outlets 112 and positioned between first and second tool organizer shelves 70, 72. It is preferred that the plurality of regulated electrical communication outlets 114 be positioned on the right rear side of the tower 44, between the second and third corners 78, 77 of the tower 44. Those of ordinary skill in the art will appreciate from this disclosure that any number or configuration of regulated electrical communication outlets 114 may be provided on any portion of the tower 44 without exceeding the scope of this disclosure. Preferably, an output kill switch 119 disposed is positioned on the tower 44 opposite of the regulated electrical communication outlets 114. Specifically, it is preferred that the output kill switch 119 is positioned on the left rear side of the tower 44 between the second and fourth corners 78, 79 between the first and second tool organizer shelves 70, 72. The output kill switch 119 is preferably and configured to depower some of all of the at least one power output connection 100, including some or all of the plurality of electrical outlets 112 and plurality of regulated electrical communication outlets 114, without depowering the remainder of the temporary power distribution device 40.

To facilitate the charging of wireless communication devices 116, the temporary power distribution device 40 preferably further includes first and second tool organizer shelves 70, 72 which extend outward from the tower 44 proximate to the upper tower end 46. A handle 68 preferably extends between the first and second tool organizer shelves 70, 72 on the outer end of the first and second tool organizer shelves 70, 72 such that the handle 68 is spaced from the tower 44. The first and second tool organizer shelves 70, 72 are preferably roughly rectangular in shape, but with one side of each shelf being formed by the triangular extension of the second corner 78 of the tower 44. Preferably, the first and second tool organizer shelves 70, 72 extend from the third corner 77 to the fourth corner 79. The handle 68 is preferably positioned opposite the second corner 78 and may be rectangular prismatic or cylindrical in shape. Preferably, this configuration ensures that the handle 68 and the at least one wheel 60 are on a common side of the temporary power distribution device 40, namely the rear side 58 of the base 54.

The first and second tool organizer shelves 70, 72 preferably have raised edges that form a tool retaining lip 74 along their respective sides not defined by the second corner 78 of the tower 44. The tool retaining lip 74 preferably extends upwards from the surface of each of the tool organizer shelves 70, 72. The tool retaining lip 74 is configured to keep items on the first or second tool organizer shelves 70, 72.

The first tool organizer shelf 70 is preferably positioned above the second tool organizer shelf 72. This preferred configuration allows electrical devices, such as wireless communication devices 116 including mobile phones and smart phones, to rest on the second tool organizer shelf 72 while charging. Wireless communication devices 116 can be connected to a communication cord 118 with the communication cord 118 being connected to the plurality of regulated electrical communication outlets to allow the device 40 to charge said wireless communication device 116. The tool retaining lip 74 can keep wireless communication devices 116 from falling or sliding off the second tool organizer shelf. The placement of the second tool organizer shelf 72 below the first tool organizer shelf 70 can help to protect wireless communication devices 116 from falling debris or objects in the construction site.

The handle 68 preferably extends from the top of the second tool organizer shelf 72 to the bottom of the first tool organizer shelf 70. The handle 68 preferably runs parallel to the vertical axis 50 and is preferably generally straight and in the shape of a cylinder or rectangular prism. Those of ordinary skill in the art will appreciate from this disclosure that the handle 68 may be formed of any shape or may be provided in any number without exceeding the scope of this disclosure.

It is preferred that the handle, first tool organizer shelf 70, second tool organizer shelf 72, and angled guide shelf 80 be formed of suitably hard and durable material, such as steel or other metals, hard or molded plastic, and the like. Those of ordinary skill in the art will appreciate from this disclosure that these elements may be formed of any suitable materials without exceeding the scope of this disclosure.

Referring to FIGS. 4-6 and 17-18, in the preferred embodiment the temporary power distribution device 40 is configured to be moved by rolling. Specifically, the preferred method of moving the temporary power distribution device 40 involves a person placing his or her foot 146 on top of the foot prop 66 and grasping the handle 68 with his or her hand 148. As the user pulls backward and downward on the handle 68 with his or her hand 148 while exerting pressure on the foot prop 66 with his or her foot 146, the base 54 preferably raises from the support surface 152 to eventually place the full weight of the temporary power distribution device 40 on the at least one wheel 60. The temporary power distribution device 40 may be moved to a new location before being lowered onto a new support surface 152 by releasing pressure on the handle 68 to allow the base 54 to come to rest on the support surface 152. Those of ordinary skill in the art will appreciate from this disclosure that any steps may be added or omitted or performed in any order without exceeding the scope of this disclosure.

Described another way, prior to being moved, the temporary power distribution device 40 has a horizontal axis 150 defined by the base 54 that is roughly parallel to the support surface 152 while the base 54 is resting on the support surface 152. When the base 54 is resting generally flat against a support surface 152, such as a floor, it is preferred that the horizontal axis 150 defined by the base 54 is roughly parallel to the support surface 152. The tower 44 defines a vertical axis 50 that is roughly perpendicular to the horizontal axis 150. As the user pulls backward and downward on the handle 68 with his or her hand 148 while exerting pressure on the foot prop 66 with his or her foot 146, the base 54 preferably raises from the support surface 152 As that occurs, the angle of the horizontal axis 150 relative to the support surface 152 taken along the front side 56 of the device 40 increases until the device 40 rests only on the wheel 60. Simultaneously, the angle of the vertical axis 50 relative to the support surface 152 taken along the rear side 58 of the device 40 decreases from roughly 90 degrees to an angle between 89 degrees and 1 degree. The relationship of 1.) the angular position of the horizontal axis 150 relative to the support surface 152 taken along the front side 56 of the device 40; and 2.) the angular position of the vertical axis 50 relative to the support surface 152 taken along the rear side 58 of the device 40 is therefore inversely proportional.

Referring to FIGS. 7-9, 12, and 19-20, the temporary power distribution device 40 may include a power station housing 42 having a base 54 and a tower 44. The base 54 is configured to be non-permanently placed on a support surface 152 during use, such that the power station housing 42 is portable. The temporary power distribution device may include a power input connection 100 configured to connect to an external power supply 102 and at least one power output connection 110 located on the power station 42 housing for connection to electronic devices, thus the device acts to distribute electrical power. The device 40 may include an internal power reserve 108 to power aspects of the device 40 when outside power is lost, such as an audible alarm 120. It is preferred that the audible alarm 120 be positioned on the tower 44. The audible alarm 120 is preferably formed of some manner of a noise emitter and amplifier, such as a speaker. In some preferred embodiments, the device 40 may further include an alarm override button 124 and an alarm activation button 123 to deactivate or activate the alarm or emergency condition or to revoke the determination of the emergency condition. While the terms alarm override button 124 and an alarm activation button 123 are used, those of ordinary skill in the art will appreciate from this disclosure that these elements may be two separate elements of formed of single piece, and may be formed of toggle switches, push switches, key pads, or any other suitable element. The alarm activation button 123 and alarm override button 124 are preferably positioned on the tower 44, preferably between the first corner 76 and fourth corner 79. The temporary power distribution device 40 may also include a beacon light 122 powered by the internal power reserve 108 and/or power received from the external power supply 102 and configured to activate when the emergency condition is determined. The beacon light 122 is preferably configured to light up or flash when activated. The device 40 preferably further includes an alert electronic control 125 in the chamber 104 and connected to the internal wiring 154, alarm override button 124, alarm activation button 123, audible alarm 120, and beacon light 122. Such a configuration may allow the alarm override button 124 and/or alarm activation button 123 to activate the audible alarm 120 and/or beacon light 122.

The device 40 may also include a signal receiving network device 126 such as a wireless or Bluetooth router, internet enable processer, and the like. The signal receiving network device 126 is preferably configured to receive an alert signal from another temporary power distribution device 40 within a predetermined range via a wireless signal 141. The temporary power distribution device 40 preferably also includes a signal transmitting network device 128 for sending the alert signal to other temporary power distribution devices within the predetermined range via a wireless signal 141. In other words, a network of power distribution devices 140 is formed of a plurality of the temporary power distribution devices 40 which are networked wirelessly, connected via a wireless signal 141.

Through such a configuration, one or more temporary power distribution devices 40 may communicate the existence of an emergency condition. Two or more connected temporary power distribution devices 40 may form a network of power distribution devices 140. When an emergency condition is determined by one of the temporary power distribution devices 40 in the network of power distribution devices 140, then the alert signal may be transmitted to other temporary power distribution devices 40 within the predetermined range and network of power distribution devices 140 and the audible alarm 120 and beacon light 122 may be activated. The a signal transmitting network device 128, a signal reviewing network device 126, the audible alarm 120, and the beacon light 122 are preferably all powered by one or more of the group of: (1) the internal power reserve; and (2) power received from the external power supply. A power sensor 113 may be connected to the internal wiring 154 and configured to determine when to draw power from the internal power reserve 108 and which elements to allow to access the internal power reserve 108 or external power supply 102.

The emergency condition is meant to indicate when a danger for workers or nearby persons might exist. For example, power may be lost due to fire, earthquake, building or mine collapse, and the like. Alternatively, power may not be lost, but workers or persons near the temporary power distribution device 40 may be aware of some danger or emergency. Thus, an emergency condition may be triggered when at least one of the group of power supplied to the power input connection 100 via the external power supply 102 fails; the alert signal is received by the signal receiving network device 126 within a temporary power distribution device 128 from the wireless signal 141 emitted by the signal transmitting network device 128 of another temporary power distribution device 40; and the alarm activation button 123 disposed on the power station housing 42 is activated.

Referring to FIGS. 1-3 and 8, the temporary power distribution device 40 preferably includes a canister 130 disposed on the tower 44. The canister is preferably a partially hollow cylinder of plastic or metal with an opening of the belt to be removed from. The canister 130 may contain a retractable belt 132, a nylon or fabric strap is preferably spring loaded such that it automatically retracts when pressure is not applied to keep it from retracting. The retractable belt 132 preferably has an end which may fit into a receptacle 134 on the outside of the canister 130. This may include a slot in the canister 130 for the end of the retractable belt 132 to clip into, or for a retractable belt 132 to engage the receptacle 134 in some other manner. In the preferred embodiment, some or all of the network of power distribution devices 140 may be physically connected via the retractable belts 132 and the receptacle 134 in the canister 130.

Figure 3:
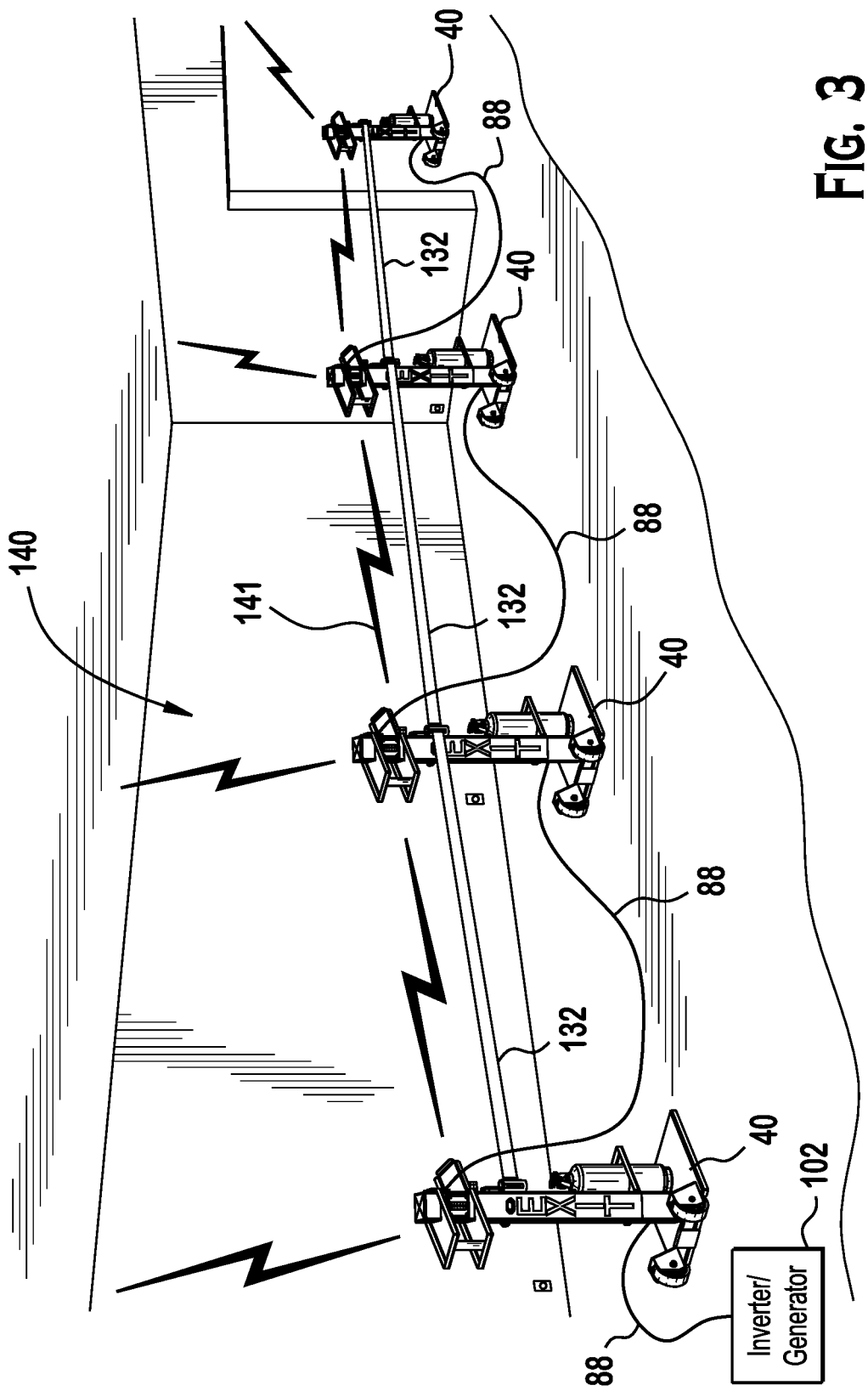
FIG. 3 is a partial perspective view of a network of portable safety devices 140 (also referred to herein as "network 140) of a preferred embodiment, wherein two or more temporary power distribution devices 40 (four are shown in the figure) are physically connected via retractable belts 132 and share power via a power cord 88 connected in a power output connection 110 of one device 40 and the power input connection 100 of another. The first device 40 is connected to an external power supply 102. Each device 40 may comprise a signal transmitting network device 128 and a signal receiving network device 126 to allow the devices 40 to be connected via wireless signal 141, thus forming a network of power distribution devices 140.
Figure 4:
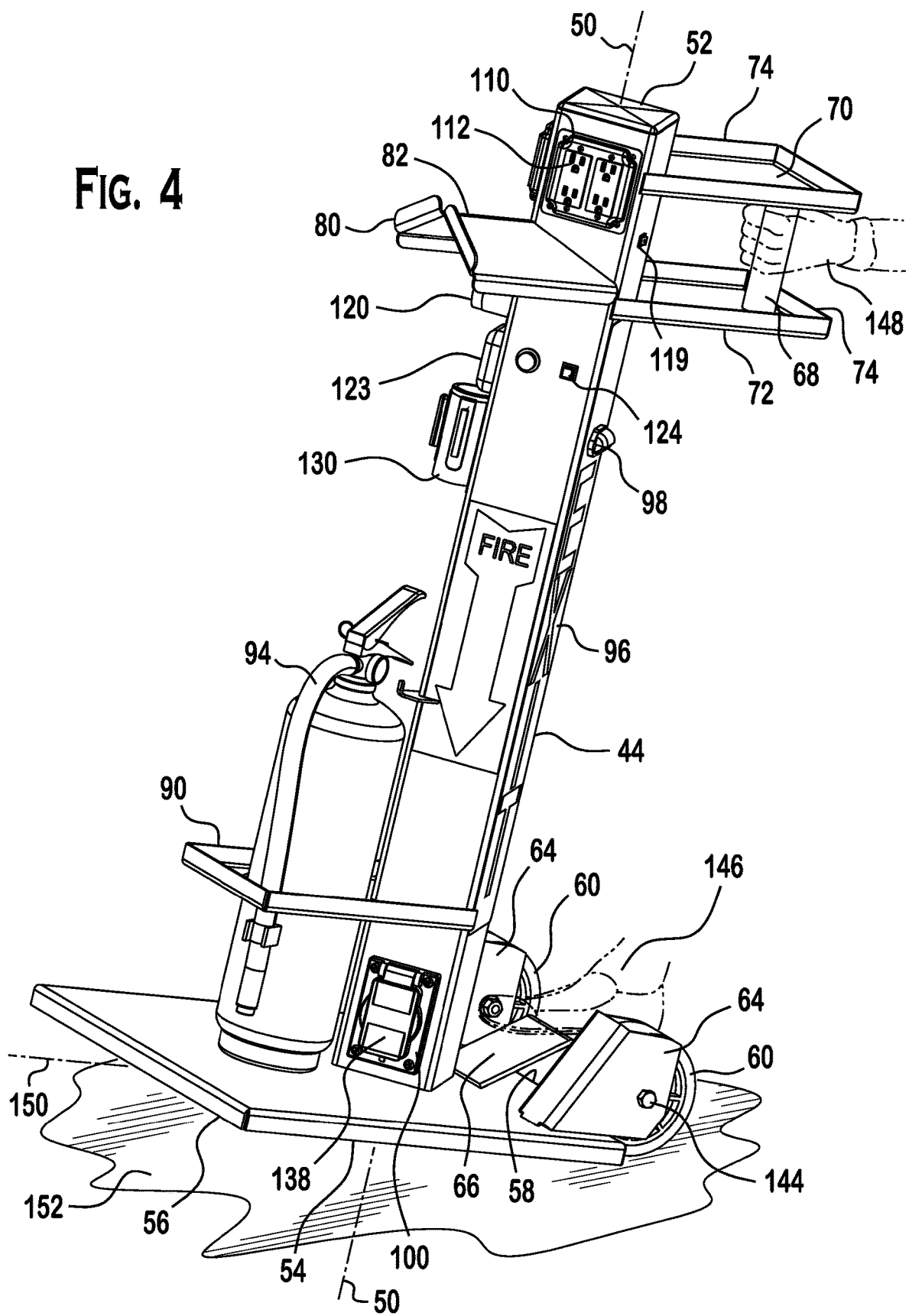
FIG. 4 is a front left perspective view of the temporary power distribution device 40 of a preferred embodiment, showing how the preferred embodiment may be configured for movement. Preferably, at least one wheel 60 (with two wheels 60 being preferred) is positioned on the rear side 58 of the base 54. In some embodiments, the wheel 60 may be positioned in a wheel cutout 62 and housed within a wheel guide 64. A foot prop 66 may be positioned on the rear side 58 of the base 54 between two wheel guides 64. In the preferred embodiment, the upper tower end 46 may include two parallel tool organizer shelves 70, 72 (also referred to collectively as "the shelves 70, 72") which extend outward from the tower 44. The first tool organizer shelf 70 is preferably positioned above the second tool organizer shelf 72. The shelves 70, 72 preferably each run parallel to one another and the horizontal axis 150 of the base 54. In preferred embodiments, a handle 68 may be positioned between the first and second tool organizer shelves 70, 72 on the outer end of the shelves 70, 72. The handle 68 is preferably spaced away from the second corner 78 so that I can be grasped by a hand 148 and such that the handle 68 is positioned roughly directly above the foot prop 66 when the base 54 is resting generally flat against a support surface 152, such as a floor. When pressure is applied to the foot prop 66 by a foot 146 and the handle 68 is pulled back by a hand 148, the angle of the horizontal axis 150 relative to the support surface 152 increases as the angle of the vertical axis 50 relative to the support surface 152 decreases. Such a configuration allows the device 40 to be pulled directly onto the wheel 60 or wheels 60 and to be steered by the handle 68, facilitating easier movement.
Figure 5:
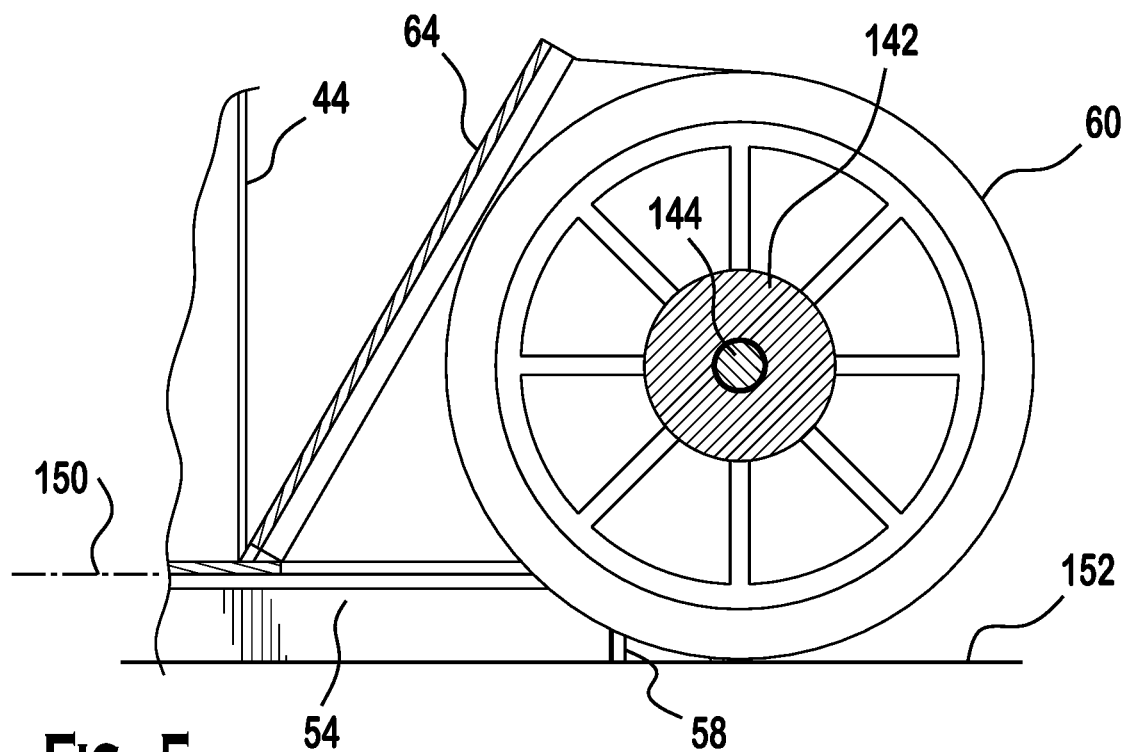
FIG. 5 is a partial cross-sectional view of the rear side 58 of the base 54 when the base 54 is resting on the support surface 152. In such a position, the horizontal axis 150 is roughly parallel to the support surface 152. The figure shows that that the wheel 60 is preferably positioned in a wheel cutout 62 defined by the base 54 and within a wheel guide 64. The wheel 60 preferably include a bearing 142 within the center of the wheel. 60. A pin 144 may be positioned through one side of the wheel guide 64, the bearing 142 within the wheel 60, and the other side of the wheel guide 64, and then secured in position by a fastener 145, such as a nut. This configuration preferably allows the wheel 60 to rotate while being retained within the wheel guide 64. In some preferred embodiments, in which two wheels 60 are provided, it is preferred that the fastener 145 be positioned on the inner side of the wheel guide 64. In other words, it is preferred that the fastener 145 by positioned on the outside of the wheel guide 64 on the side closest to the foot prop 66.
Figure 6:
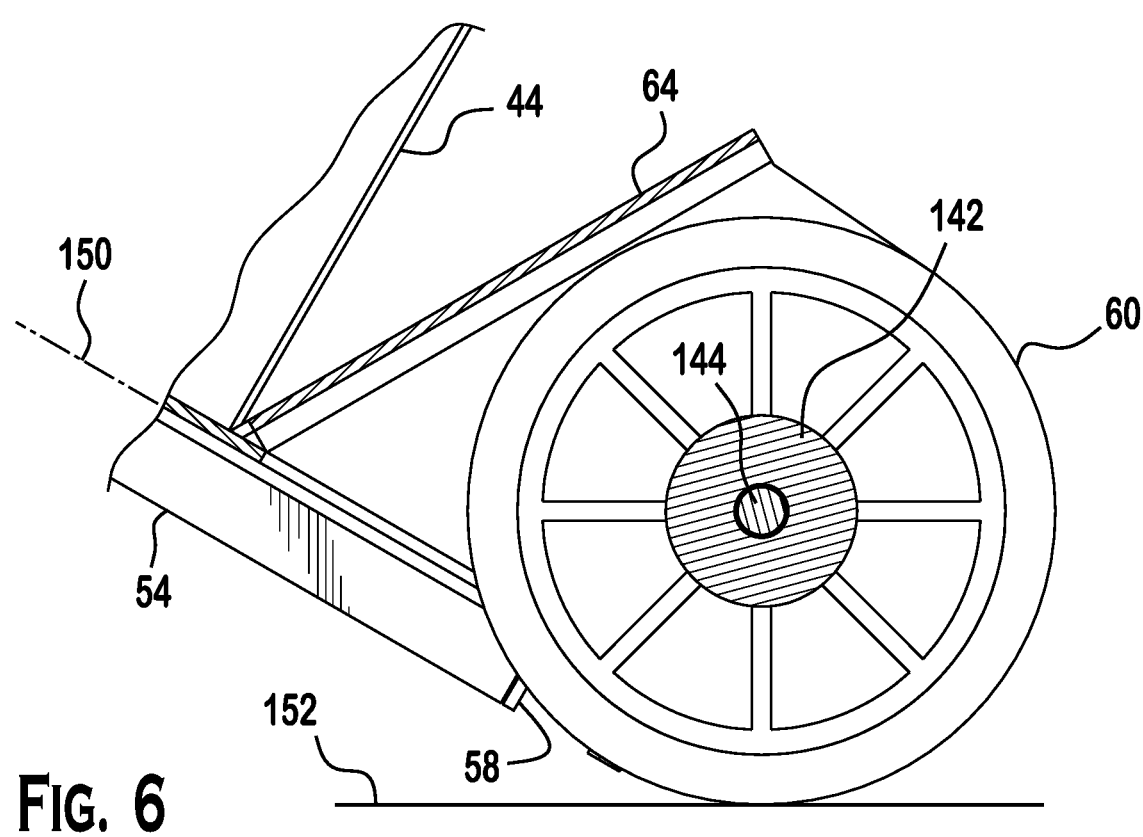
FIG. 6 is a partial cross-sectional view of the rear side 58 of the base 54 when the base 54 has been raised from the support surface 152 such that the angle of the horizontal axis 150 relative to the support surface 152 along the front side 56 of the base 54 has increased until the device 40 rests only on the wheel 60. Preferably no part of the base 54, including the rear side 58, is in contact with the support surface 152.
Figure 7:
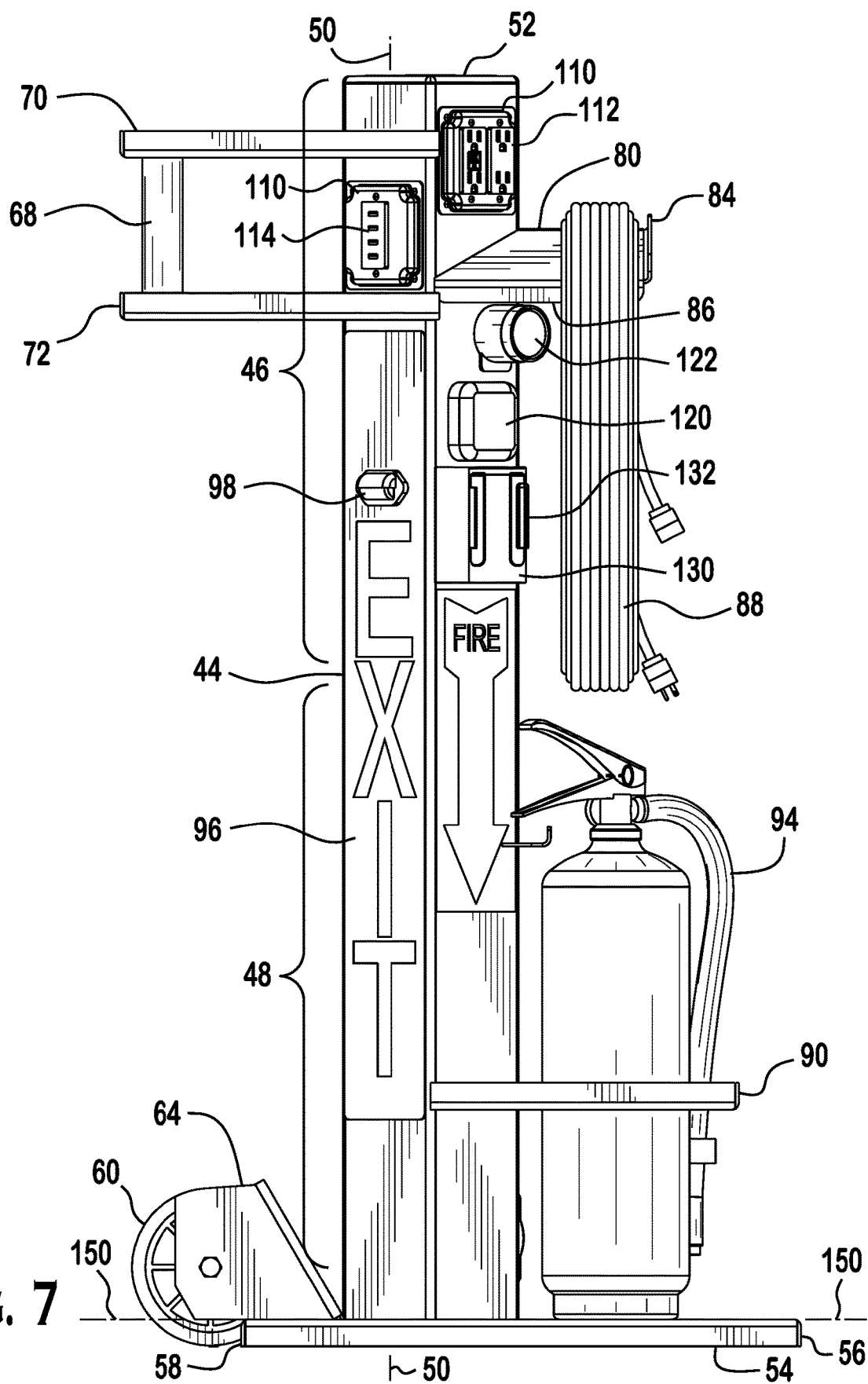
FIG. 7 is a right-side elevational view of the temporary power distribution device 40 of the preferred embodiment. The figure shows the general designations of the upper tower end 46 and lower tower end 48 in brackets formed of broken lines. The figure further shows the device 40 preferably includes at least one power output connection 110 from which devices, tools, and other electric device can derive power. In the preferred embodiment, the device 40 preferably includes a plurality of electrical outlets 112 on the front side of the tower 44, to which electrical devices can be connected. It is preferred that an angled guide shelf 80 is positioned below the electrical outlets 112 on the tower 44, with the angled guide shelf 80 coming to an apex 82 along the first corner 76 of the tower 44. It is preferred that the front side of the angled guide shelf 80 turns upwards to form a cord retaining lip 84 to keep power cords 88 on the angled guide shelf 80. The angled guide shelf 80 preferably also includes guide extensions 86 extending downward from each lateral end of the angled guide shelf 80 to further guide power cords 80 away from the front of the device 40. Such a configuration ensures that power cords 88 do not cover the front of the device 40 and may allow power cords 88 to be wrapped around the angled guide shelf 80, as seen in the figure. The at least one power output connection 110 preferably also includes a plurality of regulated electrical communication outlets 114, such as USB outlets, into which certain wireless communication devices 116, such as smart phones, can be plugged indirectly, using a communication cord 118. The tower 44 preferably also includes an indicia 96, an element included to provide important information such as the direction of an exit or location of the device 40 to workers. The indicia 96 is preferably illuminated by an illuminator light 98 which may be powered by the external power supply 102 when power is being provided, and by an internal power reserve 108 when power has been lost.
Figure 8:
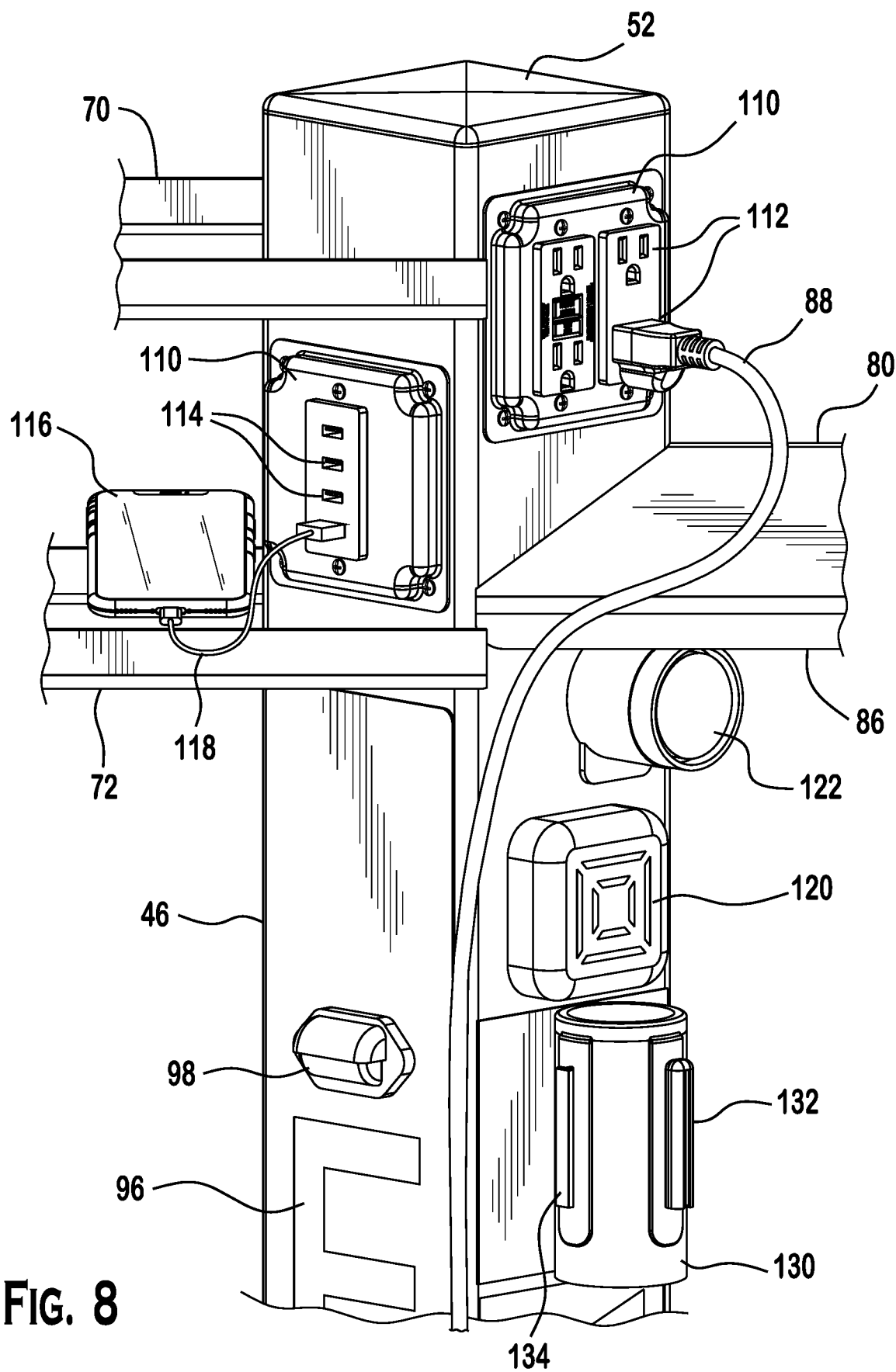
FIG. 8 is a partial right-side elevational view of the upper tower end 46, showing that it is preferred that the plurality of regulated electrical communication outlets 114 be positioned relatively between the first tool organizer shelf 70 and second tool organizer shelf 72. The shelves 70, 72 preferably define a tool retaining lip 74 along at least here sides. The tool retaining lip 74 preferably extends upwards from the shelves 70, 72. This preferred configuration allows electrical devices and, in particular, wireless communication devices 116 such as mobile phones and smart phones, to rest on the second tool organizer shelf 72 while attached to a communication cord 118, the communication cord 118 being connected to the plurality of regulated electrical communication outlets to allow the device 40 to charge said wireless communication device 116. By being positioned in the second tool organizer shelf 72, the wireless communication device 116 may be protected from falling debris or objects by the first tool organizer shelf 70. The figure further demonstrates how power cords 88 may be inserted into the electrical outlets 112 and may be guided to the lateral sides of the device 40 by the guide extension 86. The figure further depicts the audible alarm 120, such as a speaker, and beacon light 122 which may be activated by an alarm condition, either by manual activation or when such a condition is communicated by other networked devices 40. The figure further shows the preferred position of the canister 130 with the retractable belt 132 therein and the receptacle 134 defined thereon.
Figure 9:
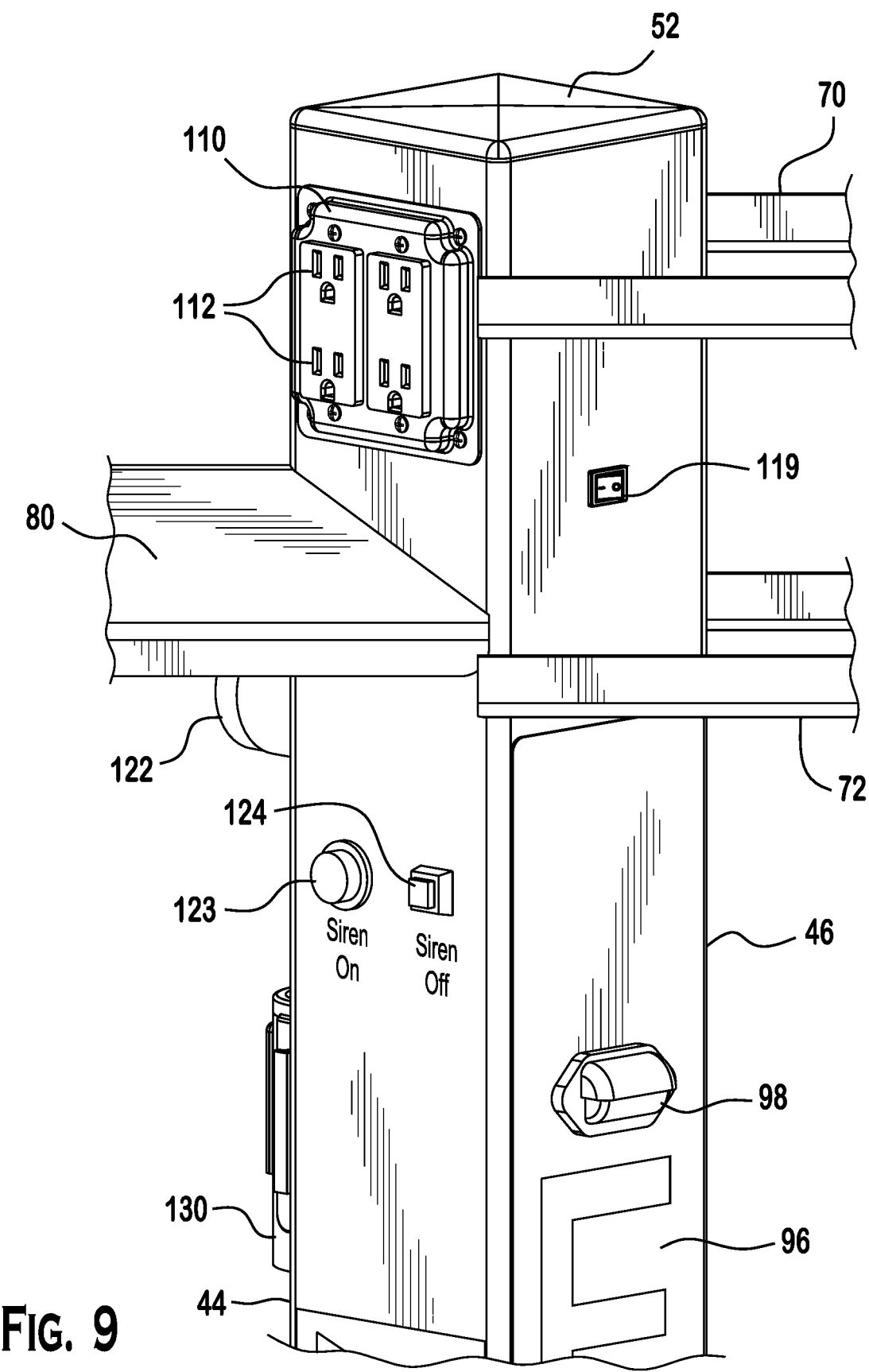
FIG. 9 is a partial left-side elevational view of the upper tower end 46, showing that it is preferred that an output kill switch 119 may be positioned between the first tool organizer shelf 70 and second tool organizer shelf 72 opposite the plurality of regulated electrical communication outlets 114. An alarm activation button 123 and/or an alarm override button 124 may be positioned of the tower 44 opposite the audible alarm 120 and beacon light 122 to manually trigger or cancel an emergency condition. While the alarm activation button 123 and the alarm override button 124 are shown to be separate elements in the figures, in some preferred embodiments the alarm activation button 123 and the alarm override button 124 may be formed of a single elements, like a toggle switch. The figure also shows that, in the preferred embodiment, an indicia 96 and illuminator light 98 may be positioned on both lateral sides of the tower 44.
Figure 10:
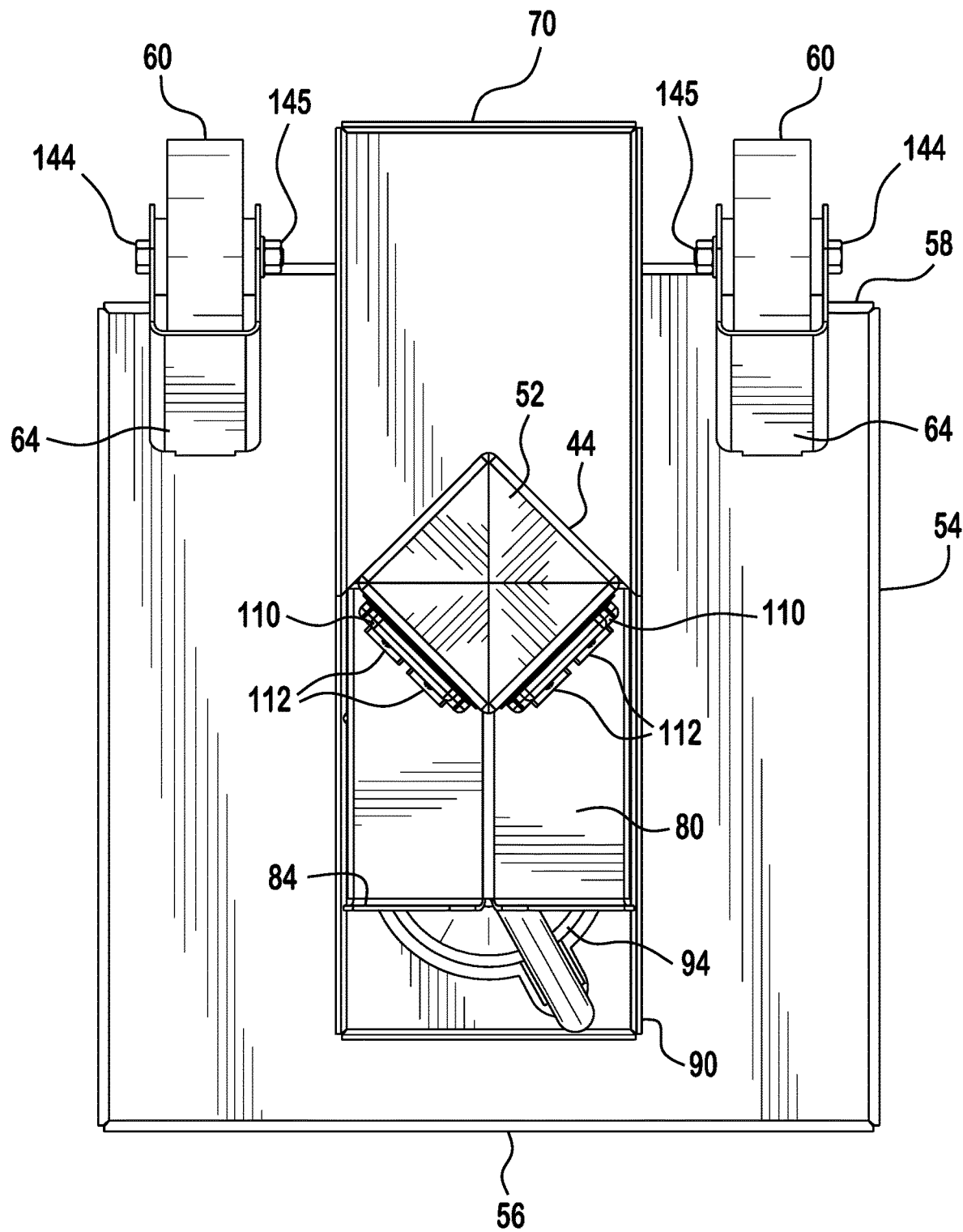
FIG. 10 is a top elevational view of the temporary power distribution device 40 of a preferred embodiment, further demonstrating the preferred position of the angled guide shelf 80 below the plurality of electrical outlets 112. The plurality of electrical outlets 112 are preferably included on both sides the first corner 76 of the tower 44. The apex 82 of the angled guide shelf 80 is shown to be generally directly above the fire extinguisher 94 and, by its positioning along the first corner 76, the alarm 120 and beacon light 122. Such a configuration ensures that power cords 88 will not prevent access to the fire extinguisher 94 or block the sound of the alarm 120 nor light from the beacon light 122.
Figure 19:
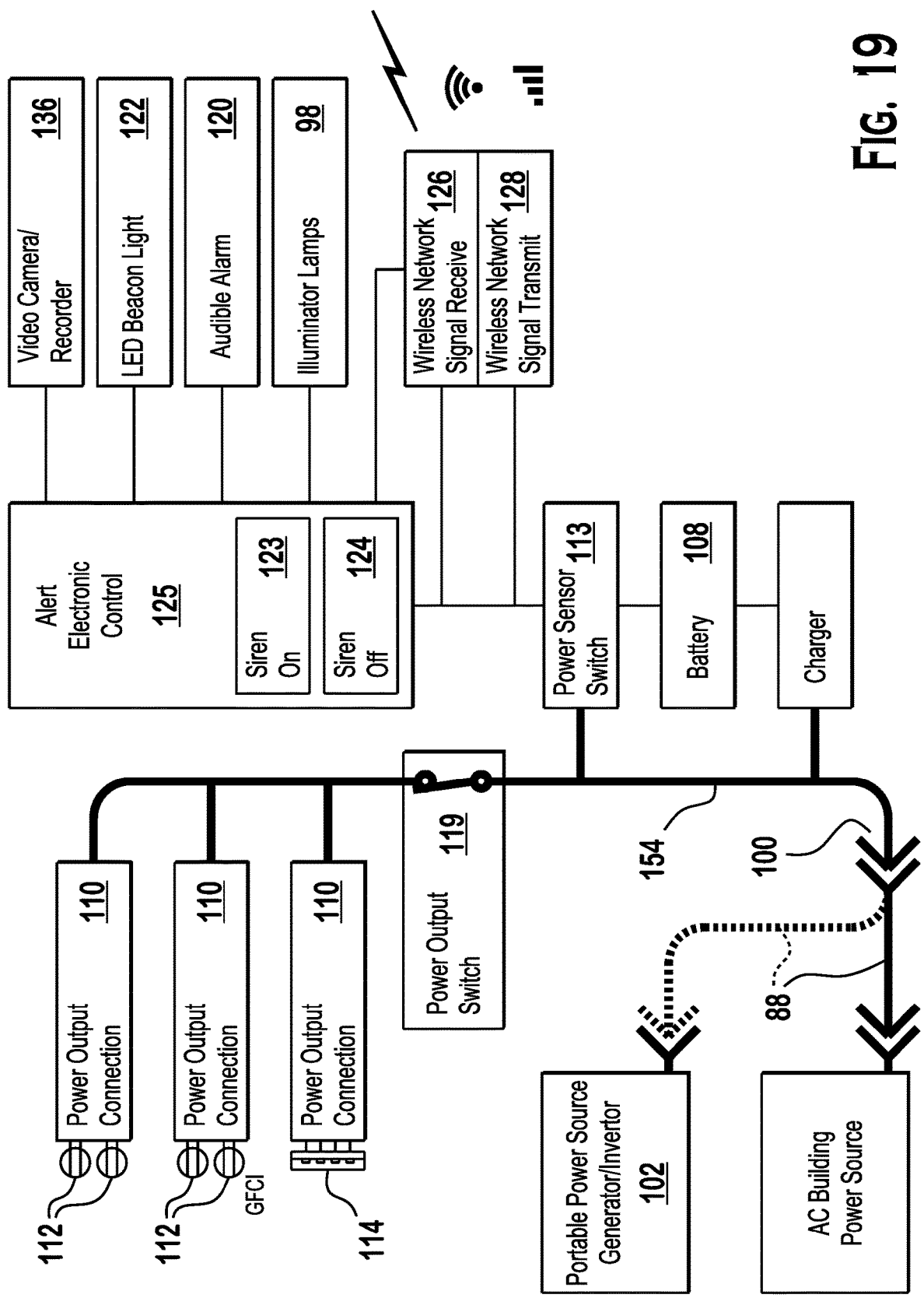
FIG. 19 is a schematic view of the temporary power distribution device 40 of a preferred embodiment, demonstrating that the electronics positioned generally positioned within the chamber 104 within the tower 44. The electrical current preferably begins with an external power supply 102 which the figure indicates may include a portable power source generator/invertor or an AC building power source. The internal wiring 154 can link the external power source 102 to elements that include the internal power reserve 108 such as a battery, which may also include a charge to add power to the internal power reserve 108. A power sensor 113, also known as a power sensor switch, may be included to determine if power needs to be drawn from the internal power reserve 108. The at least one power output connection 110 may include a plurality of electrical outlets 112 and/or a plurality of regulated electrical communication outlets 114, and these may be connected to an output kill switch 119, also known as a power output switch, to selectively cut power to the at least one power output connection. The ground fault circuit interrupt 106 (also known as GFCI) may be positioned within the plurality of electrical outlets 112 rather than the power input connection 100 in some preferred embodiments. The external power supply 102 and internal power reserve 108 are preferably connected, through the power sensor 113, to some or all of: the audible alarm 120, the beacon light 122 (also known as an LED beacon light), the illuminator light 98 (also known as illuminator lamps), the video recorder 136 (also known as a video camera/recorder), the signal receiving network device 126 (also known as the wireless network signal receive), and the signal transmitting network device 128 (also known as a wireless network signal transmit). Such a configuration can increase safety in the event of an emergency which may include loss of external power. The audible alarm 120 and/or the beacon light 122 may be connected to the alarm activation button 123 (also known as siren on) and/or alarm override button 124 (also known as siren off) by an alert electronic control 125 which enables the alarm activation button 123 and alarm override button 124 to turn on or turn off the audible alarm 120 and beacon light 122, respectively. This may facilitate increased safety by ensuring that the sources of emergency conditions are known and can be studied after the fact.

It is preferred that at least some of the network of power distribution devices 140 be connected by retractable belts 132 connected to one of the temporary power distribution devices 40 and placed securely into the receptacle 134 of another temporary power distribution device 40. This configuration, as can be seen in FIGS. 3 and 19, can mean the retractable belts 132 create a temporary barrier which can keep persons in front of the temporary power distribution device 40 from tripping on power cords 88 like those connected to the power input connection 100. The retractable belts 132 may also create a lead line, which can be physically touch and followed toward an exit in the event or an emergency condition, loss of power, and more.

In some preferred embodiments, the device 40 may also include a video recorder 136 like a video camera. The video recorder 136 is meant to act in the manner of a flight data recorder in airplanes (sometimes known as a "black box"), recording images to determine the cause of an emergency condition or other emergency. The video recorder 136 may be positioned within the chamber 104 or maintenance cap 52 or may be positioned on the outside of the tower 44. The video recorder 136 may record video to its own internal hard drive or may transmit video wirelessly. In some preferred embodiments, the video recorder 136 may be connected to the signal transmitting network device 128 to better transmit video signal. The video recorder 136 is preferably connected to the internal power reserve 108 and external power supply 102 to ensure it does not lose power in an emergency. However, the video recorder 136 may contain its own power reserve or battery. Preferably, the video recorder 136, signal receiving network device 126, and signal transmitting network device 128 are connected to one the plurality of regulated electrical communication outlets 114 or a separate regulated electrical communication outlet positioned on the tower 44, to allow these components to be connected to a wireless communication device 116 via communication cord 118. Such a configuration may allow these components to be accessed, and their settings changed, via wireless communication device 116. In alternate preferred embodiments, these elements may be connected to the internet via wireless signal 141, allowing the settings of these elements to be changed via wireless communication devices 116 connected to the internet.

To more specifically refer to the assembly of the electronics and general internal wiring 154 within the chamber 104, referring to FIG. 19 the electrical current preferably begins with an external power supply 102 which the figure indicates may include a portable power source generator/invertor or an AC building power source. The internal wiring 154 can link the external power source 102 to elements that include the internal power reserve 108 such as a battery, which may also include a charge to add power to the internal power reserve 108. A power sensor 113, also known as a power sensor switch, may be included to determine if power needs to be drawn from the internal power reserve 108. The at least one power output connection 110 may include a plurality of electrical outlets 112 and/or a plurality of regulated electrical communication outlets 114, and these may be connected to an output kill switch 119, also known as a power output switch, to selectively cut power to the at least one power output connection. The ground fault circuit interrupt 106 (also known as GFCI) may be positioned within the plurality of electrical outlets 112 rather than the power input connection 100 in some preferred embodiments. The external power supply 102 and internal power reserve 108 are preferably connected, through the power sensor 113, to some or all of: the audible alarm 120, the beacon light 122 (also known as an LED beacon light), the illuminator light 98 (also known as illuminator lamps), the video recorder 136 (also known as a video camera/recorder), the signal receiving network device 126 (also known as the wireless network signal receive), and the signal transmitting network device 128 (also known as a wireless network signal transmit). Such a configuration can increase safety in the event of an emergency which may include loss of external power. The audible alarm 120 and/or the beacon light 122 may be connected to the alarm activation button 123 (also known as siren on) and/or alarm override button 124 (also known as siren off) by an alert electronic control 125 which enables the alarm activation button 123 and alarm override button 124 to turn on or turn off the audible alarm 120 and beacon light 122, respectively. This may facilitate increased safety by ensuring that the sources of emergency conditions are known and can be studied after the fact.

Additional safety tools may be provided, and the device 40 may be specially configured to accommodate those tools. For example, one or more flashlights may be provided, preferably along the tower 88 or extinguisher shelf 90. Flashlights may be detachably affixed to the tower 44 or extinguisher shelf 90 by clips or magnets. Similarly, clips or other means may be provided to detachably affix a first aid or emergency supply kit to the tower 44 or base 12. Additional alarms may also be provided and wired into the device 10, with or without an emergency battery back-up, such as carbon monoxide or radon detectors. These configurations may be particularly suitable for mining, drilling, or disaster relief uses. Additionally, the simultaneous activation of connected devices may facilitate the evacuation of large (multi-story or complex layout) construction projects.

Figure 20:
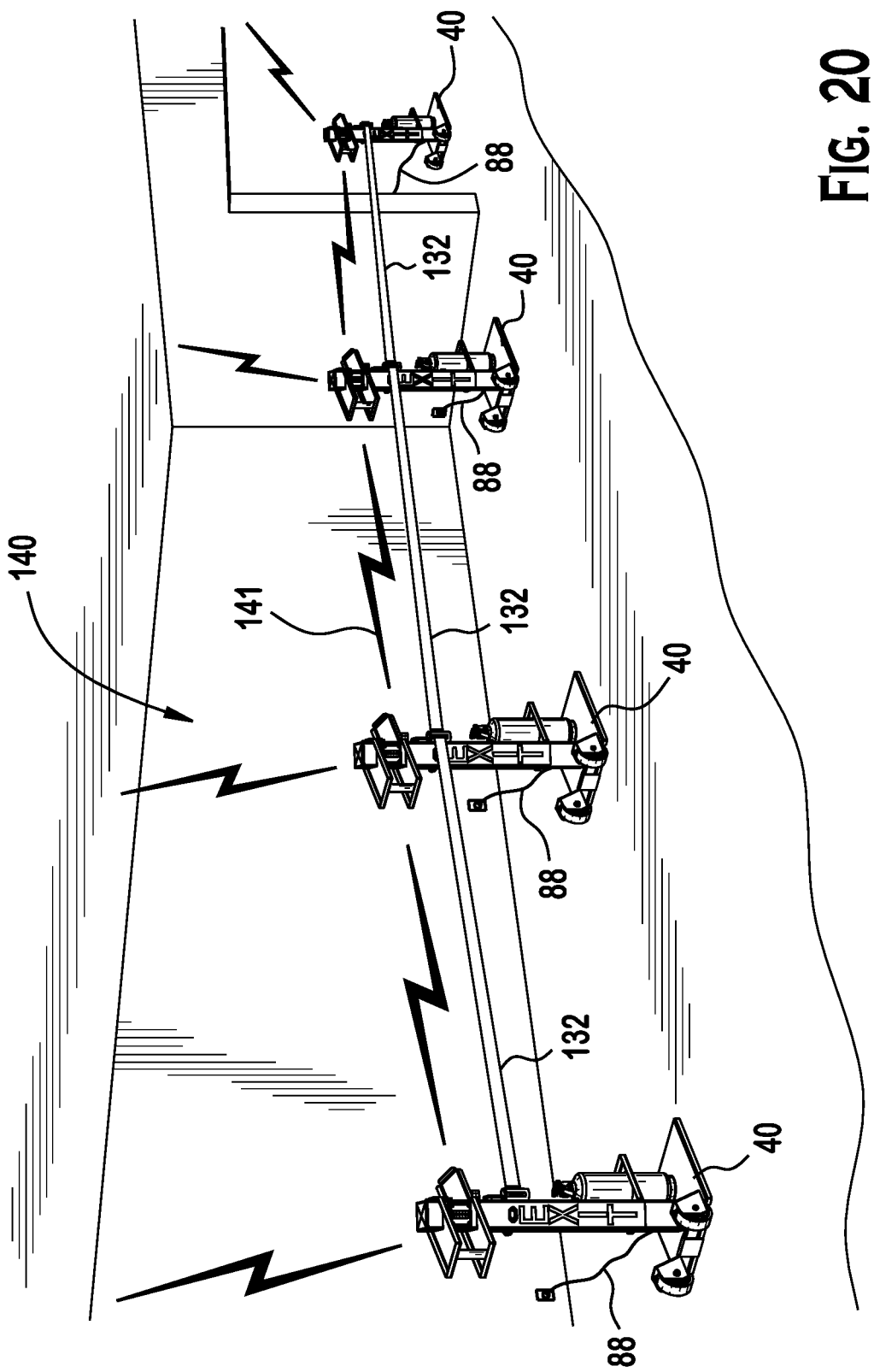
FIG. 20 is a partial perspective view of a network of portable safety devices 140 (also referred to herein as "network 140) of a preferred embodiment, wherein at least two temporary power distribution devices 40 (four devices 40 are shown in the figure) are physically connected via retractable belts 132. Each device 40 is connected to an external power supply 102 via its respective power input connection 100. Each device 40 may comprise a signal transmitting network device 128 and a signal receiving network device 126 to allow the devices 40 to be connected via wireless signal 141, thus forming a network of power distribution devices 140.

Referring to FIGS. 3, 19, and 20, one preferred method of use of the temporary power distribution device 40 operates as follows. A user may plug one side of a power cord 88 into an external power supply 102. A temporary power distribution device 40 may be placed at a desired location, with the base 54 resting on the desired support surface 152, within reach of the power cord 88. The power cord 40 may then be plugged into external power receiver 88. Power cords 88 attached to tools, tools, and other devices may then be plugged into some of the at least one power output connection 110 on the tower 12. A second temporary power distribution device 40 may then be placed at a desired location near the first, with the base 54 of the second device 40 positioned against the support surface 152. A power cord 88 may be plugged into one of the plurality of electrical outlets 112 of the first temporary power distribution device 40 and into the power input connection 100 of the second temporary power distribution device 40, providing power to the second temporary power distribution device 40. The retractable belt 132 of the first temporary power distribution device 40 can be partially removed from the canister 130 and may be engaged with the receptacle 134 on the canister 130 of the second temporary power distribution device 40, connecting the two temporary power distribution devices 40 to form a network of power distribution devices 140. The respective signal receiving network devices 126 and signal receiving network devices 128 of the two temporary power distribution devices 40 may communicate via wireless signal 141 to wirelessly connect the network of power distribution devices 140.

In the event of an emergency, a person may push the alarm activation button 123 on the first temporary power distribution device 40, activating the audible alarm 120 and beacon light 122 on the first temporary power distribution device 40. The signal receiving network device 126 may wirelessly transmit the alert signal to the signal transmitting network device 128 of the second temporary power distribution device 40 via wireless signal 141. This may cause the alert electronic control 125 to activate the audible alarm 120 and beacon light 122 on the first temporary power distribution device 40. If the emergency condition abates, a person can press the alarm override button 124 on the first or second temporary power distribution device 40 deactivating the audible alarm 120 and beacon light 122 on the each through wireless signal 141.

It is recognized by those skilled in the art that changes may be made to the above described methods without departing from the broad inventive concept thereof. It is understood, therefore, that this invention is not limited to the particular embodiments disclosed but is intended to cover all modifications which are within the spirit and scope of the invention as defined by the above specification, the appended claims and/or shown in the attached drawings.

The invention claimed is:

1. A temporary power distribution device, comprising:
   a power station housing having a base and a tower, wherein the base is configured to be non-permanently positioned on a support surface, even during use, such that the power station housing is portable;
   a power input connection located on the power station housing and configured to connect to an external power supply;
   at least one power output connection located on the power station housing;
   an internal power reserve;
   a signal receiving network device configured to receive an alert signal from another temporary power distribution device within a predetermined range;
   a signal transmitting network device for sending the alert signal to other temporary power distribution devices within the predetermined range;
   an audible alarm disposed on the power station housing;
   a beacon light on the tower;
   an indicia on the tower providing a visual cue for determining a location of the temporary power distribution device; and
   an illuminator light disposed on the tower;
   wherein an emergency condition is determined when at least one of the group of (1) power supplied to the power input connection via the external power supply fails, (2) the alert signal is received from the another temporary power distribution device; and (3) an alert activation button disposed on the power station housing is activated;
   wherein when the emergency condition is determined then the alert signal is transmitted to other temporary power distribution devices within the predetermined range and the audible alarm is activated and powered by one of the group of: (1) the internal power reserve; and (2) power received from the external power supply;
   wherein the beacon light is configured to activate at least when the emergency condition is determined, the beacon light being powered by one of the group of: (1) the internal power reserve; and (2) power received from the external power supply; and wherein the illuminator light is configured to shine on the indicia at least when the emergency condition is determined and being powered by one of the group of: (1) the internal power reserve; and (2) power received from the external power supply.

2. The device of claim 1, wherein the tower has a vertical axis, a lower tower end, and an upper tower end, the temporary power distribution device further comprising an extinguisher shelf extending from the tower and spaced from the base, the extinguisher shelf defining an extinguisher cutout and being configured such that a fire extinguisher can be located within the extinguisher cutout and braced by the extinguisher shelf and the base.

3. The device of claim 2, further comprising:
first and second tool organizer shelves extending outward from the tower proximate the upper tower end;
a handle extending between the first and second tool organizer shelves and spaced from the tower; and
at least one wheel connected to the base such that the base can be tilted and rolled on the at least one wheel to change a temporary position thereof while holding onto the handle.

4. The device of claim 3, wherein the handle and the at least one wheel are on a common side of the temporary power distribution device.

5. The device of claim 3, further comprising a canister disposed on the tower, the canister holding a retractable belt, the canister defining a receptacle for engaging another retractable belt therein.

6. The device of claim 5, further comprising an alarm override button configured to revoke the determination of the emergency condition.

7. The device of claim 6, further comprising a video recorder disposed on the tower, the video camera being configured to wirelessly transmit a video stream.

8. The device of claim 7, wherein the base defines at least one wheel cutout therethrough, the base further comprising a wheel guide disposed about the at least one wheel cutout, the at least one wheel being rotatably mounted to the wheel guide.

9. The device of claim 8, wherein the base has opposing lateral sides, wherein the at least one power outlet connection includes a plurality of electrical outlets located on the tower proximate to the upper tower end, the temporary power distribution device further comprising an angled guide shelf having an upside down V-shape and located between the plurality of electrical outlets and the base such that power cords connected to one of the plurality of electrical outlets are encouraged to drape on one side of the tower and any fire extinguisher held thereon.

10. The device of claim 9, wherein the base has a rear side located proximate to the at least one wheel and a front side located opposite to the rear side, the tower having a rectilinear cross section, as viewed perpendicular to the vertical axis, such that a first corner of the rectilinear cross section is located closest to the front side, the angled guide shelf having an apex aligned with the first corner.

11. The device of claim 10, wherein the power input connection is located proximate the lower tower end and between the base and extinguisher shelf.

12. The device of claim 11, further comprising the power station housing defining a chamber therein, the internal power reserve being disposed in the chamber, a ground fault circuit interrupt being located in the chamber.

13. The device of claim 12, the at least one power output connection further comprising a plurality of regulated electrical communication connectors located on the tower.

14. The device of claim 13, wherein the upper tower end of the power station housing comprises a maintenance cap detachably affixed to the tower.

15. The device of claim 14, further comprising an output kill switch disposed on the tower and configured to depower the at least one power output connection without depowering the remainder of the temporary power distribution device.

16. A network of power distribution devices, comprising a plurality of the temporary power distribution device of claim 14, wherein the plurality of the temporary power distribution devices are connected wirelessly.

17. The network of claim 16, wherein at least some of the plurality of temporary power distribution devices are physically connected via the retractable belt and the receptacle.

* * * * *